(12) United States Patent
Ichikawa et al.

(10) Patent No.: US 12,165,273 B2
(45) Date of Patent: Dec. 10, 2024

(54) INFORMATION PROCESSING DEVICE AND INFORMATION PROCESSING METHOD

(71) Applicant: SONY GROUP CORPORATION, Tokyo (JP)

(72) Inventors: Miwa Ichikawa, Tokyo (JP); Kunihito Sawai, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 124 days.

(21) Appl. No.: 17/906,720

(22) PCT Filed: Mar. 8, 2021

(86) PCT No.: PCT/JP2021/008944
§ 371 (c)(1),
(2) Date: Sep. 19, 2022

(87) PCT Pub. No.: WO2021/192956
PCT Pub. Date: Sep. 30, 2021

(65) Prior Publication Data
US 2023/0154128 A1    May 18, 2023

(30) Foreign Application Priority Data

Mar. 26, 2020 (JP) .................................. 2020-056229

(51) Int. Cl.
*G06T 19/20* (2011.01)
*G06F 3/0346* (2013.01)
*G06V 10/74* (2022.01)

(52) U.S. Cl.
CPC ............ *G06T 19/20* (2013.01); *G06F 3/0346* (2013.01); *G06V 10/761* (2022.01); *G06T 2219/2004* (2013.01)

(58) Field of Classification Search
CPC .............................. G06F 3/0346; G06T 19/20
See application file for complete search history.

(56) References Cited

U.S. PATENT DOCUMENTS

2012/0007857 A1* 1/2012 Noda .................. G06F 3/04812
                                                                    345/419
2018/0005438 A1    1/2018 Mathey-Owens et al.
(Continued)

FOREIGN PATENT DOCUMENTS

JP      11-331992 A    11/1999
JP    2002-044797 A     2/2002
(Continued)

OTHER PUBLICATIONS

International Search Report and Written Opinion of PCT Application No. PCT/JP2021/008944, issued on May 18, 2021, 08 pages of ISRWO.

*Primary Examiner* — Charles Tseng
(74) *Attorney, Agent, or Firm* — CHIP LAW GROUP

(57) ABSTRACT

An information processing device includes an acquisition unit, a setting unit, a determination unit, and a control unit. The acquisition unit acquires an operation angle that is an angle formed by a first direction in a predetermined space pointed by a user and a second direction in the predetermined space pointed by the user. The setting unit sets, as a reference angle, the operation angle acquired at a time point when an instruction to start moving a virtual object on a line extending in the first direction is detected. The determination unit determines whether or not the operation angle acquired in response to a change in the second direction is equal to or more than the reference angle. The control unit controls a display unit to move the virtual object in a depth direction on the line in the first direction and display the virtual object while maintaining a distance between an intersection where the first direction and the second direction intersect and the virtual object on the basis of a determination result of the determination unit. Consequently, the position of a distant (Continued)

virtual object can be finely adjusted at a hand position where the operation is easy.

11 Claims, 16 Drawing Sheets

(56) References Cited

U.S. PATENT DOCUMENTS

| | | | |
|---|---|---|---|
| 2018/0005443 A1* | 1/2018 | Poulos | G06F 3/017 |
| 2018/0158250 A1 | 6/2018 | Yamamoto et al. | |
| 2020/0005540 A1* | 1/2020 | Challagolla | G06T 19/20 |

FOREIGN PATENT DOCUMENTS

| | | | |
|---|---|---|---|
| JP | 2018-500674 A | 1/2018 | |
| KR | 20190106851 A * | 9/2019 | G06F 3/0236 |

* cited by examiner

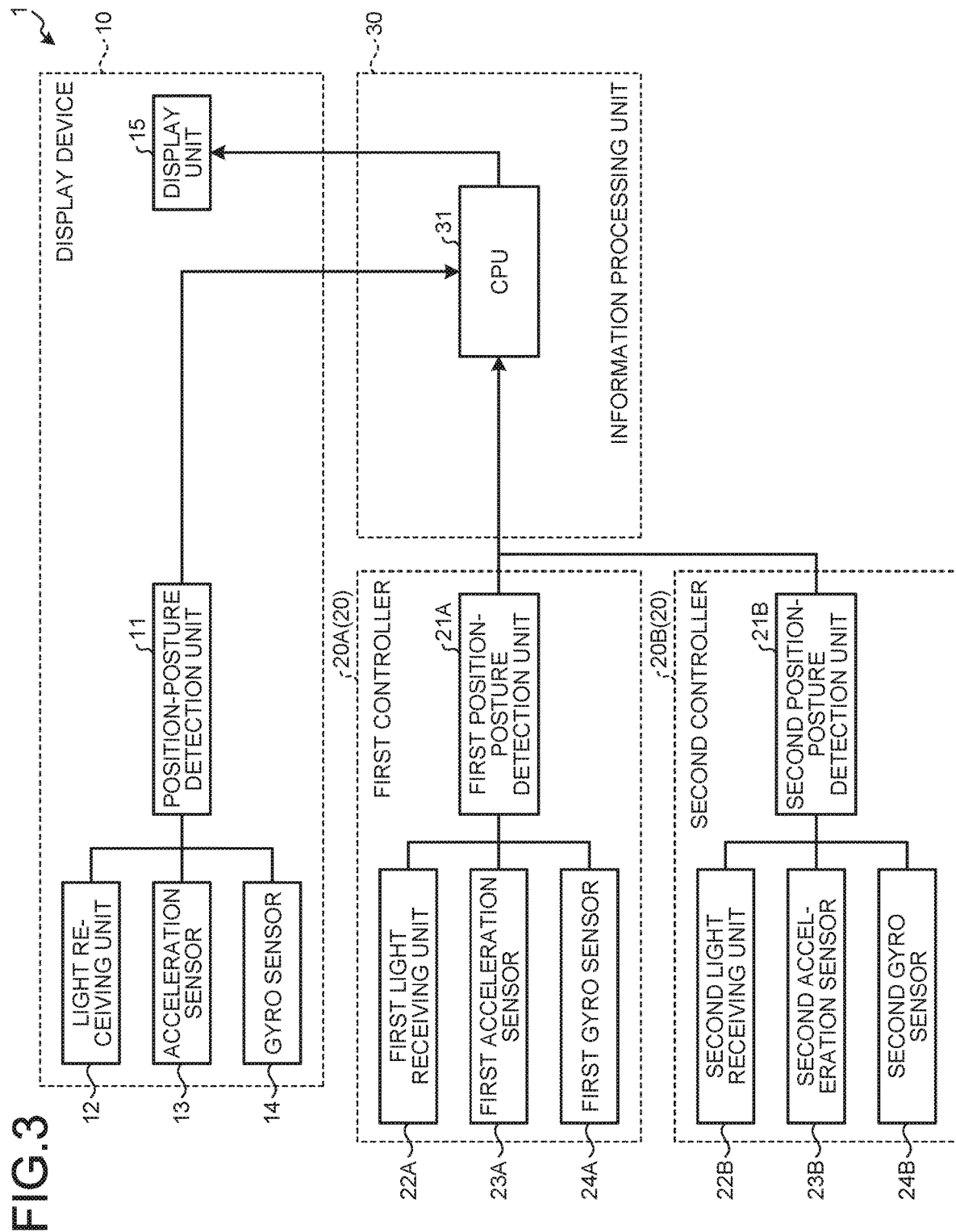

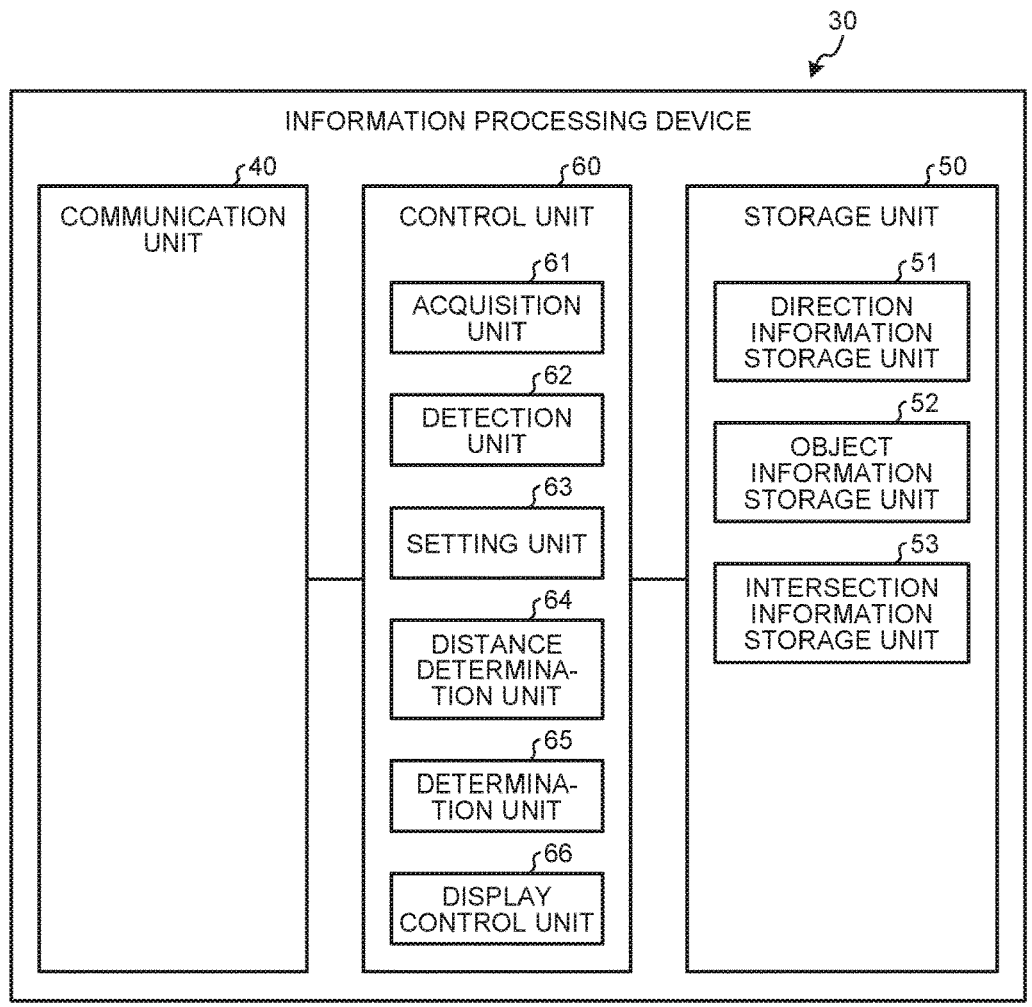

FIG.6

| OBJECT ID (52A) | OBJECT INFORMATION (52B) | FLAG | | ... |
| --- | --- | --- | --- | --- |
| | | GRAVITY FLAG (52D) | GRIPPING FLAG (52E) | ... (52C) |
| VO1 | OINF1 | 1 | 1 | ... | ... |
| VO41 | OINF41 | 0 | 0 | ... | ... |
| ... | ... | ... | ... | ... | ... |

FIG.7

| INTERSECTION ID (53A) | MASTER-SLAVE INFORMATION | | |
| --- | --- | --- | --- |
| | MASTER-SLAVE RELATIONSHIP (53C) | MASTER INSTRUCTION COMPONENT (53D) | SLAVE INSTRUCTION COMPONENT (53E) |
| P | PRESENT | FIRST CONTROLLER | SECOND CONTROLLER |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/008944 filed on Mar. 8, 2021, which claims priority benefit of Japanese Patent Application No. JP 2020-056229 filed in the Japan Patent Office on Mar. 26, 2020. Each of the above-referenced applications is hereby incorporated herein by reference in its entirety.

FIELD

The present disclosure relates to an information processing device, an information processing method, and an information processing program.

BACKGROUND

For example, in a device for operating a virtual object in a three-dimensional space, improvement regarding localization of a line of sight is desired in pointing and object operation by a line of sight due to a human visual adjustment mechanism.

Accordingly, there is known an information processing device that controls a display device so as to display a stereoscopic object that is arranged along a predetermined direction in a visual field of a user and indicates a distance in the predetermined direction, and achieves pointing and object operation by the user's line of sight. Consequently, improvement regarding localization of the line of sight is achieved.

CITATION LIST

Patent Literature

Patent Literature 1: JP 11-331992 A
Patent Literature 2: JP 2002-44797 A

SUMMARY

Technical Problem

In a conventional information processing device, a stereoscopic object indicating a distance is displayed, and a virtual object can be arranged while visually recognizing a position where the virtual object is desired to be arranged. However, in the conventional information processing device, in a case where the position where the virtual object is to be arranged is distant, if the viewing angle changes even a little with respect to the position where the virtual object is desired to be arranged, the arrangement position greatly deviates.

Therefore, the present disclosure proposes an information processing device or the like capable of finely adjusting the position of a virtual object located far in a predetermined space.

Solution to Problem

To solve the problems described above, an information processing device according to an embodiment of the present disclosure includes an acquisition unit, a setting unit, a determination unit, and a control unit. The acquisition unit acquires an operation angle that is an angle formed by a first direction in a predetermined space pointed by a user and a second direction in the predetermined space pointed by the user. The setting unit sets, as a reference angle, the operation angle acquired at a time point when an instruction to start moving a virtual object on a line extending in the first direction is detected. The determination unit determines whether or not the operation angle acquired in response to a change in the second direction is equal to or more than the reference angle. The control unit controls a display unit to move the virtual object in a depth direction on the line in the first direction and display the virtual object while maintaining a distance between an intersection where the first direction and the second direction intersect and the virtual object on the basis of a determination result of the determination unit.

BRIEF DESCRIPTION OF DRAWINGS

FIG. 3 is a diagram illustrating an example of the information processing system.

FIG. 4 is a diagram illustrating an example of a functional configuration of an information processing device.

FIG. 5 is a diagram illustrating an example of a direction information storage unit.

FIG. 6 is a diagram illustrating an example of an object information storage unit.

FIG. 7 is a diagram illustrating an example of an intersection information storage unit.

DESCRIPTION OF EMBODIMENTS

Figure 1:
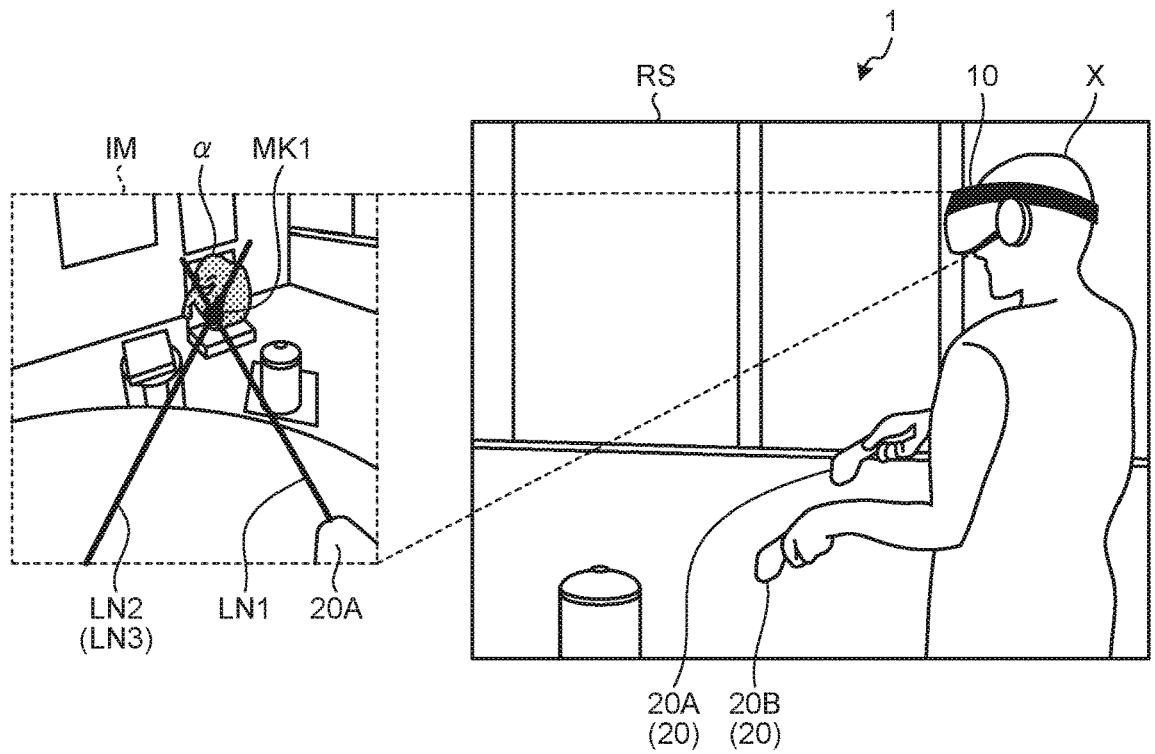
FIG. 1 is views illustrating an example of an information processing system according to an embodiment of the present disclosure.

Hereinafter, embodiments of the present disclosure will be described in detail with reference to the drawings. Note that in each of the following embodiments, the same parts are denoted by the same reference numerals, and redundant description will be omitted.

Furthermore, the present disclosure will be described according to the following order of items.

1. Introduction
1-1. Outline of Information Processing System
2. Configuration of Information Processing System of Embodiment
2-1. Configuration of Display Device
2-2. Configuration of Controller
2-3. Configuration of Information Processing Device
2-4. Functional Configuration of Control Unit
3. Operation of Information Processing System
3-1. Intersection Generating Process
3-2. Gripping Process of Virtual Object
3-3. Moving Process of Virtual Object
3-4. Releasing Process of Virtual Object
4. Effects of Embodiment
5. Modification Example
5-1. Other Releasing Processes of Virtual Object
5-2. Other Gripping Processes of Virtual Object
5-3. Other Moving Processes of Virtual Object
5-4. Other Instruction Components
5-5. Other Display Forms of Virtual Object
5-6. Other Master-Slave Relationships
5-7. Other Display Forms of Lines
5-8. Other Geometric Targets
6. Hardware Configuration
7. Conclusion

1. Introduction

<1-1. Outline of Information Processing System>

In a conventional information processing device, a stereoscopic object indicating a distance is displayed, and a virtual object can be arranged while visually recognizing a position where the virtual object is desired to be arranged. However, in the conventional information processing device, in a case where the position where the virtual object is to be arranged is distant, if the viewing angle changes even a little with respect to the position where the virtual object is desired to be arranged, the arrangement position greatly deviates.

Therefore, in the conventional information processing device, in a case where a stereoscopic object is displayed, there are many restrictions on an instruction of a target such as a position or a virtual object by a user, and it is difficult to perform the instruction by the user or display according to the instruction. Thus, it is desired to enable flexible display according to the user's instruction.

Accordingly, the present applicant proposes an information processing device that controls a display device so as to display a mark for a virtual object at an instruction position that is a position determined on the basis of a plurality of directions pointed by the user. Consequently, the flexible display according to the user's instruction is enabled.

FIG. 1 is a view illustrating an example of information processing according to an embodiment of the present disclosure. The information processing according to the embodiment of the present disclosure is implemented by an information processing device 30 illustrated in FIG. 3. An information processing system 1 illustrated in FIG. 1 includes a display device 10, a first controller 20A(20), a second controller 20B(20), and an information processing device 30 that controls display on the display device 10. The display device 10 is, for example, a head mounted display (HMD) mounted on the head of a user X in a real space RS. The display device 10 displays an image IM according to the display control of the information processing device 30 on a display unit 15 located in front of the eyes of the user X.

Note that the display device 10 may be a head mounted display such as a non-transmissive HMD, a transmissive HMD, or the like as long as it is capable of implementing processing to be described later. Furthermore, the display device 10 is not limited to the head mounted display, and may be any device as long as it is capable of implementing information processing to be described later, and for example, may be various devices such as an aerial projection display. Details of the configuration of the display device 10 will be described later.

Furthermore, FIG. 1 illustrates a case where the user X carries the first controller 20A in the right hand and carries the second controller 20B in the left hand. Hereinafter, in a case where the first controller 20A and the second controller 20B are not distinguished, they may be described as a controller 20. The controller 20 is a device used by the user X to point at a direction. The user X points at a desired direction by arranging a hand carrying the controller 20 at a desired position or in a desired orientation. For example, the controller 20 is used to instruct a position in a space of augmented reality (AR), virtual reality (VR), mixed reality (MR), or the like displayed by the display device 10, or to point at an object (also referred to as a "virtual object") in the space.

FIG. 1 illustrates a case where a line is used as an element (target) for allowing the user X to visually recognize the direction pointed by the user X. For example, a line along the direction pointed by the user X allows the user X to visually recognize the direction pointed by the user X. In FIG. 1, a line extending in the direction pointed by the user X with the controller 20 is displayed on the display device 10, thereby allowing the user X to visually recognize the direction pointed by the user X with the controller 20. FIG. 1 illustrates a case where a line extending from the controller 20 is a virtual beam displayed by the display device 10. For example, the display device 10 displays a line extending from the controller 20 along an axis passing through a predetermined position (for example, origin 21A1, origin 21B1, and the like in FIG. 8) of the controller 20.

Note that the line extending from the controller 20 is not limited to the virtual beam displayed by the display device 10, and may be a beam (laser beam) actually emitted by the controller 20. In a case where the controller 20 actually emits a laser beam (line), the controller 20 emits the laser beam along a predetermined optical axis. Furthermore, the element for allowing the user X to visually recognize the direction pointed by the user X is not limited to a line, and may be a plane or the like. Hereinafter, a line, a plane, or the like used for allowing the user X to visually recognize the direction indicated by the user X may be collectively described as a geometric target. Furthermore, a direction instruction by the user X is not necessarily performed by the device such as the controller 20 but may be performed by the body of the user X, or the like, and the device, the body of the user X, or the like used by the user to point to the direction may be collectively described as an instruction component. The instruction component may be any component as long as it is used by the user X to point to a direction.

The image IM in FIG. 1 is an image displayed in front of the eyes of the user X by the display of the display device 10 worn by the user X. In the image IM in FIG. 1, a line LN1 corresponding to the direction pointed by the first controller 20A and a line LN2 corresponding to the direction pointed by the second controller 20B are displayed.

The user X changes a desired position and direction of the hand carrying the controller 20 while confirming the position and orientation of the line LN1 and the position and orientation of the line LN2, thereby designating a position determined on the basis of the line LN1 and the line LN2 (hereinafter, also referred to as an "instruction position"). In the example of FIG. 1, the user X adjusts the orientation and position of the controller 20 so that the vicinity of a center portion of an image IM1 (the vicinity of the center portion in front of his/her eyes) becomes the instruction position. Hereinafter, adjusting the orientation and position of the controller 20 may be simply described as "adjustment of the controller 20".

In the example of FIG. 1, the information processing device 30 controls the display device 10 to display a mark MK1 indicating a virtual object α at the instruction position determined by the user X on the basis of the two directions indicated by the controller 20. Here, the information processing device 30 displays the mark MK1 on the basis of the positional relationship between the two lines LN1 and LN2.

As described above, in the information processing device 30, a desired position can be easily instructed by indicating the position by two lines. The information processing device 30 enables flexible display according to an instruction of the user X by controlling the display device 10 to display the mark MK1 at an intersection P determined on the basis of the lines LN1 and LN2 corresponding respectively to two directions indicated by the user X. Furthermore, the information processing device 30 switches the display of the intersection P according to the distance between the two lines, thereby enabling flexible display corresponding to the instruction of the user X. The information processing system 1 enables the user X to freely designate a three-dimensional position in a three-dimensional space without restriction.

Since the position can be determined while dynamically changing the axis, the user X can quickly designate the position anywhere in the three-dimensional space. Furthermore, the user X can create the intersection P by bringing the two lines close to each other in a case where he or she wants to designate the position, and can end the intersection display by separating the lines or changing the orientation of the lines in a case where he or she wants to stop designating, so that the intention of the user X is intuitively reflected.

For example, the user X arranges the virtual object α in the predetermined space by lines pointing from the respective controllers 20 to the predetermined space using the two controllers 20, creates the intersection P by crossing the two lines, and arranges the virtual object α at the position of the intersection P. That is, when two lines are used, any three-dimensional position in the predetermined space can be designated.

In the information processing device 30, in a case of pointing in the vicinity of the operation position of the controller 20 of the user X by using the two controllers 20 that perform pointing in conjunction with movement of the hand of the user X, the distance change amount of the intersection P with respect to the change in operation angle between the two main lines and the operation line can be controlled.

Figure 2:
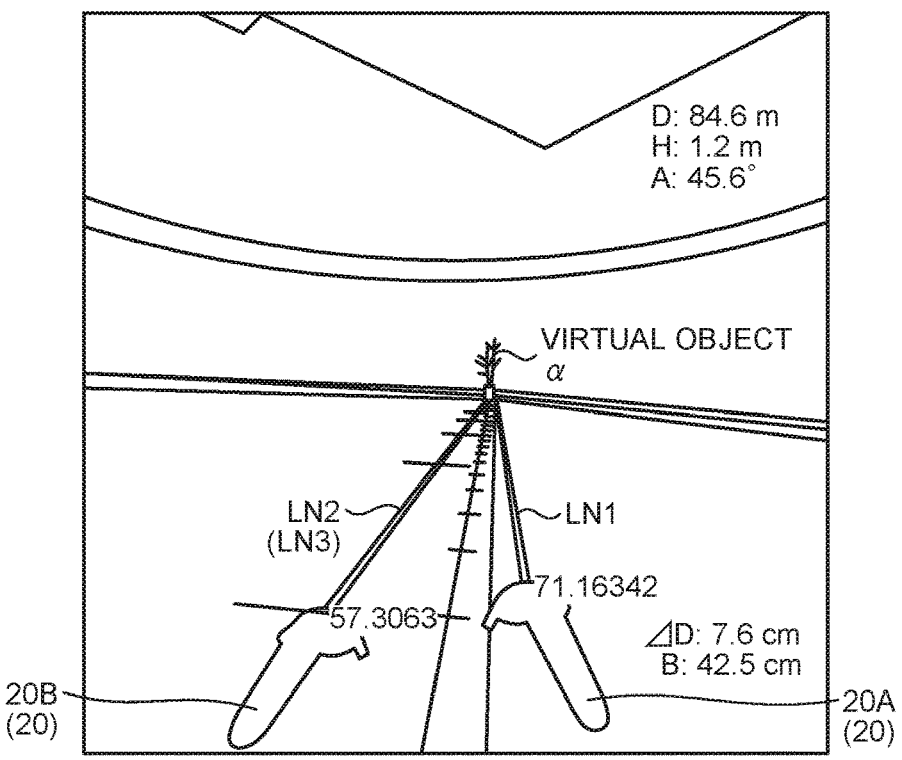
FIG. 2 is a view illustrating an example of a usage form of the information processing system.

In the present invention, for example, a scene is assumed in which the user X such as a content creator finely adjusts the three-dimensional position of the virtual object α located far in the predetermined space. FIG. 2 is a view illustrating an example of a usage form of the information processing system 1.

As illustrated in FIG. 2, the distance change amount of the intersection P with respect to the operation angle when pointing at the distant virtual object α is relatively larger than that in the vicinity. The control of the movement distance of the virtual object α based on the operation angle according to the distance from the operation position of the user X is a technical problem. That is, even at the same operation angle, the amount of movement of the position of the virtual object α is larger in the distance than in the vicinity, and thus fine adjustment of the position of the distant virtual object α is difficult.

Moreover, in a case where it is attempted to designate a distant position, the position greatly changes due to slight movement or shake of the hand, and thus in a case where it is attempted to finely adjust the position of a distant intersection or the position of the distant virtual object α, it is difficult to adjust the position.

Therefore, in the present invention, as illustrated in FIG. 2, there is a demand for the information processing device 30 capable of finely adjusting the position of the distant intersection P and the position of the virtual object α in the predetermined space by using two controllers 20, for example, finely adjusting the position of planting (virtual object α) 50 m ahead so as to move 10 cm toward a near side.

Accordingly, the information processing device 30 includes an acquisition unit, a setting unit, a determination unit, and a control unit. The acquisition unit acquires an operation angle that is an angle formed by a first direction in a predetermined space pointed by a user and a second direction in the predetermined space pointed by the user. The setting unit sets, as a reference angle, the operation angle acquired at a time point when an instruction to start moving a virtual object on a line extending in the first direction is detected. The determination unit determines whether or not the operation angle acquired by the acquisition unit in response to a change in the second direction is equal to or more than the reference angle. The control unit controls the display device 10 to move the virtual object in a depth direction on the line in the first direction and display the virtual object while maintaining a distance between an intersection where the first direction and the second direction intersect and the virtual object on the basis of a determination result of the determination unit.

The information processing device 30 determines whether or not the operation angle acquired in response to the change in the second direction is equal to or more than the reference angle, and controls the display device 10 to move the virtual object in the depth direction on the line in the first direction and display the virtual object while maintaining the distance between the intersection where the first direction and the second direction intersect and the virtual object on the basis of the determination result. Consequently, the virtual object is displayed movably in the depth direction on the line in the first direction while maintaining the distance between the intersection and the virtual object, and thus fine adjustment of the distant virtual object becomes easy.

2. Configuration of Information Processing System of Embodiment

FIG. 3 is a diagram illustrating an example of the information processing system 1. The information processing system 1 illustrated in FIG. 3 includes the display device 10, the first controller 20A(20), the second controller 20B(20), and the information processing device 30. In FIG. 3, two controllers 20 of the first controller 20A and the second controller 20B are illustrated as an example of the direction instruction components, but the information processing system 1 may include more than three direction instruction components.

The information processing system 1 is, for example, a system in which information processing related to augmented reality (AR), virtual reality (VR), or mixed reality (MR) is executed. For example, the information processing system 1 is a system for displaying or editing AR or VR content.

The information processing device 30, the display device 10, and the controller 20 are communicably connected in a wired or wireless manner via a predetermined network (not illustrated). Note that the information processing system 1 illustrated in FIG. 3 may include a plurality of display devices 10 and a plurality of information processing devices 30.

The information processing device 30 controls the display device 10 to display the mark of the virtual object α at an instruction position that is a position determined on the basis of a plurality of directions pointed by the user. The information processing device 30 controls display on the display device 10 using controller information acquired from the controller 20. The information processing device 30 controls the display of the display device 10 by using the information regarding the position and posture of the display device 10 acquired from the display device 10.

<2-1. Configuration of Display Device>

The display device 10 includes a position-posture detection unit 11, a light receiving unit 12, an acceleration sensor 13, a gyro sensor 14, and a display unit 15. The position-posture detection unit 11 detects the position and posture of the display device 10 on the basis of various information acquired from sensors included in the display device 10 such as the light receiving unit 12, the acceleration sensor 13, and the gyro sensor 14. The position-posture detection unit 11 detects various types of information about the position, orientation, inclination, and posture of the display device 10 on the basis of the sensor information. The position-posture detection unit 11 transmits information regarding the position and posture of the display device 10 to the information processing device 30. For example, the position-posture detection unit 11 may be implemented by various processors such as a central processing unit (CPU), a graphics processing unit (GPU), and a field programmable gate array (FPGA).

The display unit 15 is a display that displays various types of information according to the control of the information processing device 30. For example, the display device 10 acquires various types of information from the information processing device 30, and displays the acquired information on the display unit 15. The display unit 15 displays the mark of the virtual object α at an instruction position determined on the basis of a plurality of directions indicated by the user X according to the control of the information processing device 30. The display unit 15 displays the content generated by the information processing device 30.

Note that, in a case where the line of sight of the user X is used to designate the direction, the display device 10 may include a line-of-sight detection unit that detects the line-of-sight position of the user X. The line-of-sight detection unit detects the line of sight of the user X by appropriately using various technologies related to line-of-sight detection. As a technique of line-of-sight detection, for example, a method of detecting a line of sight on the basis of a position of a moving point of the eye (for example, a point corresponding to a moving portion in the eye such as the iris or the pupil) with respect to a reference point (for example, a point corresponding to a non-moving portion in the eye such as the inner corner of the eye or corneal reflex) of the eye may be used. Note that the detection of the line of sight is not limited to the above, and the line of sight of the user X may be detected using any line-of-sight detection technique.

<2-2. Configuration of Controller>

The first controller 20A includes a first position-posture detection unit 21A, a first light receiving unit 22A, a first acceleration sensor 23A, and a first gyro sensor 24A. The first position-posture detection unit 21A detects the position and posture of the first controller 20A on the basis of sensor information of the first light receiving unit 22A, the first acceleration sensor 23A, the first gyro sensor 24A, and the like. The first position-posture detection unit 21A detects controller information related to the position, orientation, inclination, and posture of the first controller 20A on the basis of sensor information of the first light receiving unit 22A, the first acceleration sensor 23A, the first gyro sensor 24A, and the like. The first position-posture detection unit 21A transmits the controller information to the information processing device 30. For example, the first position-posture detection unit 21A may be implemented by, for example, various processors such as a CPU, a GPU, and an FPGA. Note that in a case where the first controller 20A emits an actual beam, the first controller 20A has a configuration (a light output unit or the like) that emits a laser beam.

The second controller 20B includes a second position-posture detection unit 21B, a second light receiving unit 22B, a second acceleration sensor 23B, and a second gyro sensor 24B. The second position-posture detection unit 21B detects the position and posture of the second controller 20B on the basis of sensor information of the second light receiving unit 22B, the second acceleration sensor 23B, the second gyro sensor 24B, and the like. The second position-posture detection unit 21B detects controller information related to the position, orientation, inclination, and posture of the second controller 20B on the basis of sensor information of the second light receiving unit 22B, the second acceleration sensor 23B, the second gyro sensor 24B, and the like. The second position-posture detection unit 21B transmits the controller information to the information processing device 30. For example, the second position-posture detection unit 21B may be implemented by, for example, various processors such as a CPU, a GPU, and an FPGA. In a case where the second controller 20B emits an actual beam, the second controller 20B has a configuration (light output unit or the like) that emits a laser beam.

<2-3. Configuration of Information Processing Device>

The information processing device 30 executes various processes by the CPU 31. FIG. 4 is a diagram illustrating an example of a functional configuration of the information processing device 30. The information processing device 30 illustrated in FIG. 4 includes a communication unit 40, a storage unit 50, and a control unit 60. Note that the information processing device 30 may include, for example, an input unit such as a keyboard and a mouse, which receive various operations from an administrator or the like of the information processing device 30, and a display unit for displaying various types of information.

The communication unit 40 is implemented by, for example, an NIC, a communication circuit, or the like. Then, the communication unit 40 is connected to a predetermined network (not illustrated) in a wired or wireless manner, and transmits and receives information to and from other information processing devices such as the controller 20 and the display device 10.

The storage unit 50 is achieved by, for example, a semiconductor memory element such as a random access memory (RAM) or a flash memory, or a storage device such as a hard disk or an optical disk. The storage unit 50 includes a direction information storage unit 51, an object information storage unit 52, and an intersection information storage unit 53.

The direction information storage unit 51 stores various types of information regarding instructions of directions. FIG. 5 is a diagram illustrating an example of the direction information storage unit 51. The direction information storage unit 51 illustrated in FIG. 5 manages an instruction component 51B, a type 51C, a gripping flag 51D, and the like in association with each other for each direction ID 51A. Note that the direction information storage unit 51 is not limited to the above, and may manage various types of information according to the purpose and can be appropriately changed.

The direction ID 51A is, for example, information identifying each direction pointed by the user X. The instruction component 51B is, for example, information identifying a component used by the user X to point to a direction, for example, a device such as the controller 20 or an element related to the body of the user X. For example, in a case where a direction is indicated by a line of sight of the user X, a "line of sight" may be stored in the instruction component 51B. Furthermore, for example, in a case where the direction is indicated by a finger of the user X, a "finger" may be stored in the instruction component 51B.

The type 51C is information indicating the type of the instruction component 51B. For example, the type 51C is information indicating a type of a component used by the user to point to a direction, for example, a device such as the controller 20 or an element related to the body of the user X. For example, in a case where the direction is instructed with the controller 20, a "controller", a "device", or the like is stored in the type 51C. For example, in a case where the direction is instructed with the user's line of sight, the "line of sight", a "body", or the like is stored in the type 51C. Furthermore, for example, in a case where the direction is instructed with the finger of the user X, the "finger", the "body", or the like is stored in the type 51C.

In the example of FIG. 5, a direction (direction DG1) identified by a direction ID "DG1" indicates that the instruction component is the first controller 20A that is identified by "20A". The direction DG1 indicates that the type of the first controller 20A is a controller.

Furthermore, a direction (direction DG2) identified by a direction ID "DG2" indicates that the instruction component is the second controller 20B that is identified by "20B". The direction DG2 indicates that the type of the second controller 20B is a controller.

The object information storage unit 52 stores various types of information regarding the virtual object α. FIG. 6 is a diagram illustrating an example of the object information storage unit 52. The object information storage unit 52 illustrated in FIG. 6 manages an object information 52B, a flag 52C, and the like in association with each object ID 52A. The flag 52C includes a gravity flag 52D, a gripping flag 52E, and the like. Note that the object information storage unit 52 is not limited to the above, and may manage various types of information according to the purpose.

The object ID 52A is information identifying the virtual object α. Furthermore, the object information 52B is information corresponding to the virtual object α identified by the object ID 52A. Note that, in the example illustrated in FIG. 6, the object information 52B is illustrated with an abstract code such as "OINF1", but various types of information related to the size, shape, and the like of the virtual object α may be stored. The flag 52C is flag information corresponding to the virtual object α identified by the object ID 52A. The gravity flag 52D is information identifying whether or not the gravity flag is assigned to the virtual object α identified by the object ID 52A. The gripping flag 52E is information identifying whether or not the gripping flag is assigned to the virtual object α identified by the object ID 52A.

In the example of FIG. 6, the virtual object VO1 identified by the object ID "VO1" indicates that the object information is "OINF1". The virtual object VO1 indicates that the gravity flag is "1". That is, the virtual object VO1 is affected by gravity in determining the arrangement position. In this case, for example, it is indicated that, when arranged in the air, the virtual object VO1 is arranged at a position dropped in the gravity direction from the arranged position.

Furthermore, the virtual object VO41 identified by the object ID "VO41" indicates that the object information is "OINF41". The virtual object VO41 indicates that the gravity flag is "0". That is, it is indicated that the virtual object VO41 is not affected by gravity in determining the arrangement position. In this case, for example, it is indicated that, when arranged in the air, the virtual object VO41 remains at the arranged position.

The intersection information storage unit 53 stores various types of information regarding the intersection. FIG. 7 is a diagram illustrating an example of the intersection information storage unit 53. The intersection information storage unit 53 illustrated in FIG. 7 manages master-slave information 53B in association with each intersection ID 53A. The intersection ID 53A is information identifying an intersection. The master-slave information 53B manages a master-slave relationship 53C, a master instruction component 53D, and a slave instruction component 53E in association with each other. Note that the intersection information storage unit 53 is not limited to the above, and may store various types of information according to the purpose. The master-slave relationship 53C is information indicating the presence or absence of a master-slave relationship between instruction components that instruct each direction.

The master instruction component 53D is information indicating that a direction (geometric target) indicated by the instruction component is master. In a case where the first controller 20A is the master instruction component in the example of FIG. 1, then "20A" is stored in the master instruction component 53D. The slave instruction component 53E is information indicating that the direction (geometric target) indicated by the instruction component is slave. In a case where the second controller 20B is the secondary instruction component in the example of FIG. 1, the slave instruction component 53E stores "20B".

The control unit 60 is implemented by, for example, a central processing unit (CPU), a micro processing unit (MPU), or the like executing a program (for example, an information processing program such as a program according to the present disclosure) stored inside the information processing device 30 with the RAM or the like being a work area. Furthermore, the control unit 60 is implemented by, for example, an integrated circuit such as an application specific integrated circuit (ASIC) or an FPGA.

<2-4. Functional Configuration of Control Unit>

The control unit 60 includes an acquisition unit 61, a detection unit 62, a setting unit 63, a distance determination unit 64, a determination unit 65, and a display control unit 66, and implements or executes a function and an action of information processing described below. Note that the internal configuration of the control unit 60 is not limited to the configuration illustrated in FIG. 4, and may be another configuration as long as information processing to be described later is performed. Furthermore, the connection relationship of the processing units included in the control unit 60 is not limited to the connection relationship illustrated in FIG. 4, and may be another connection relationship.

The acquisition unit 61 acquires an operation angle that is an angle formed by a main line LN1 in the first direction extending in the depth direction and an operation line LN3 in the second direction of the horizontal plane with respect to the first direction. The detection unit 62 detects a movement instruction indicating the start of movement of the virtual object α. The setting unit 63 sets an intersection between the main line LN1 and the operation line LN3 at a time point when the movement instruction is detected as P0, a reference angle which is an angle formed by the main line LN1 and the operation line LN3 as θ0, and a distance between the main controller 20 and the intersection P0 as D0 (see FIG. 12).

The acquisition unit 61 acquires an operation angle θ at the intersection of the main line LN1 and the operation line LN3 in response to a change in the second direction by a sub controller 20. At this time, an intersection between the main line LN1 and the operation line LN3 after the change is assumed as P, an operation angle that is an angle formed by the main line LN1 and the operation line LN3 is assumed as θ, and a distance between the main controller 20 and the intersection P is assumed as D0.

Figure 12:
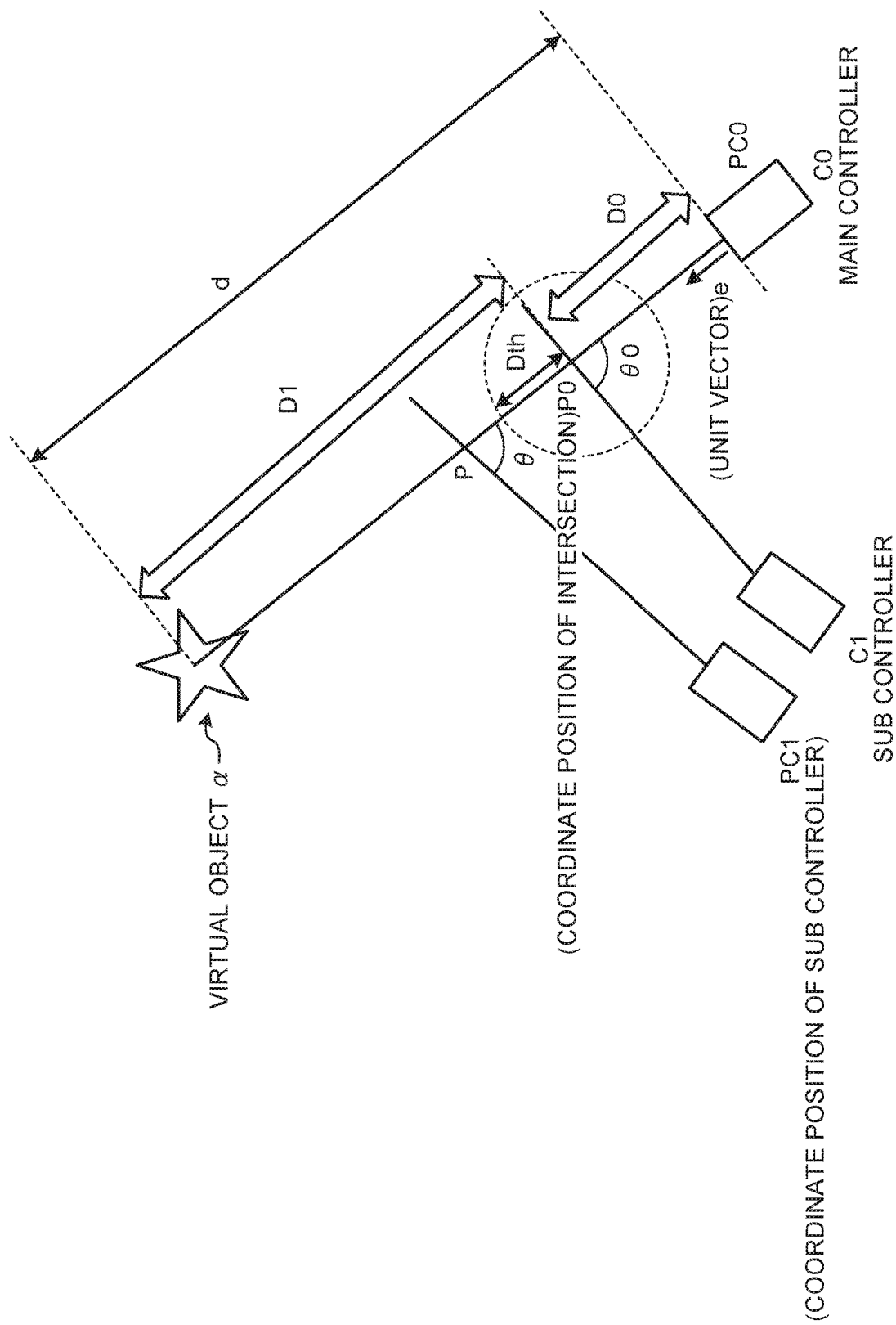
FIG. 12 is a view illustrating an example of a relationship between a main line and an operation line.

In a case where the acquisition unit 61 acquires the operation angle θ in response to the change in the second direction, the distance determination unit 64 determines whether or not the distance D1 between the virtual object α on the main line LN1 and the intersection is less than a threshold Dth (see FIG. 12).

In a case where the distance D1 between the virtual object α and the intersection P is less than the threshold Dth, the display control unit 66 causes the display unit 15 to display the virtual object α on the main line LN1 so as to be attracted to the intersection P. At this time, the distance D1 between the virtual object α and the intersection P is "0".

In a case where the distance D1 between the virtual object α and the intersection P is less than the threshold Dth, the determination unit 65 determines whether or not the operation angle θ acquired in response to the change of the operation line LN3 is equal to or more than the reference angle θ0.

In a case where the operation angle θ is equal to or more than the reference angle θ0, the display control unit 66 moves the virtual object α to a near side in the depth direction, and causes the display unit 15 to display the virtual object α. The display control unit 66 obtains the distance d between the main controller 20 and the virtual object α by distance d=(D0+D1)−|P−P0|, but since D1=0, the distance d varies such that the virtual object α is on the near side according to the movement amount of |P−P0| corresponding to the change in the operation line LN3 (see FIG. 12).

In a case where the operation angle θ is not equal to or more than the reference angle θ0, that is, in a case where the operation angle θ is less than the reference angle θ0, the display control unit 66 moves the virtual object α to a far side in the depth direction, and causes the display unit 15 to display the virtual object α. The display control unit 66 obtains the distance d between the main controller 20 and the virtual object α by distance d=(D0+D1)+|P−P0|, but since D1=0, the distance d varies such that the virtual object α is on the far side according to the movement amount of |P−P0| corresponding to the change in the operation line LN3.

In a case where the distance D1 between the virtual object α and the intersection P is not less than the threshold Dth, that is, in a case where the distance D1 is equal to or more than the threshold Dth, the display control unit 66 causes the display unit 15 to display the virtual object α and the intersection P in a state where the distance D1 between the virtual object α and the intersection P is maintained. At this time, the distance D1 between the virtual object α and the intersection P is "D1>0".

The determination unit 65 determines whether or not the operation angle θ acquired in response to the change of the operation line LN3 is equal to or more than the reference angle θ0 while maintaining the distance D1.

In a case where the operation angle θ is equal to or more than the reference angle θ0, the display control unit 66 moves the virtual object α and the intersection P to the near side in the depth direction on the main line LN1 while maintaining the distance D1, and causes the display unit 15 to display the virtual object α and the intersection P. The display control unit 66 obtains the distance d between the first controller 20A and the virtual object α by distance d=(D0+D1)−|P−P0|, but since D1>0, the distance d varies such that the virtual object is on the near side according to the movement amount of |P−P0| corresponding to the change in the operation line LN3. Furthermore, the display control unit 66 arranges the virtual object α on the near side on the main line LN1 of the coordinates obtained by the origin PC0+e (unit vector)×d of the main line, and causes the display unit 15 to display the virtual object α.

In a case where the operation angle θ is not equal to or more than the reference angle θ0, that is, in a case where the operation angle θ is less than the reference angle θ0, the display control unit 66 moves the virtual object α and the intersection P to the far side in the depth direction on the main line LN1 while maintaining the distance D1, and causes the display unit 15 to display the virtual object α and the intersection P. The display control unit 66 obtains the distance d between the first controller 20A and the virtual object α by distance d=(D0+D1)+|P−P0|, but since D1>0, the distance d varies such that the virtual object α is on the far side according to the movement amount of |P−P0| corresponding to the change in the operation line LN3. Furthermore, the display control unit 66 arranges the virtual object α on the far side on the main line LN1 of the coordinates obtained by the origin PC0+e (unit vector)×d of the main line, and causes the display unit 15 to display the virtual object α.

In the example of FIG. 1, the display control unit 66 controls the display device 10 to display the mark MK1 of the virtual object α at the instruction position determined by the user X on the basis of the two directions indicated by the controller 20. The display control unit 66 controls the display device 10 to display the lines LN1 and LN2 on the basis of the controller information acquired by the acquisition unit 61.

The display control unit 66 controls the display device 10 to display the lines LN1 and LN2 on the basis of the controller information acquired by the acquisition unit 61. The display control unit 66 controls display device 10 to display the intersection P. The display control unit 66 controls the display device 10 to display the mark MK1 as illustrated in FIG. 1 at the intersection P as the intersection P.

3. Operation of Information Processing System

Next, operation of the information processing device 30 will be described. As a precondition, the two controllers 20 are used, and the intersection P is generated using lines pointed by the respective controllers 20. The pointing line has a master-slave relationship. The master-slave relationship of the pointing line may be determined by any of priority order, order, and first win of operation. The trigger of the controller 20 displaying the main/sub line is referred to as a main/sub trigger. There is a virtual object α in the air (in empty space). The virtual object α is displayed in a star shape.

The information processing device 30 includes an intersection generating process, a gripping process of the virtual object α, a moving process of the virtual object α, and a releasing process of the virtual object α.

<3-1. Intersection Generating Process>

The intersection generating process is a process of creating an intersection P where the main line LN1 and the operation line LN3 intersect. The generating process includes an origin setting process, a reference plane setting process, an operation plane setting process, and an intersection setting process.

Figure 8:
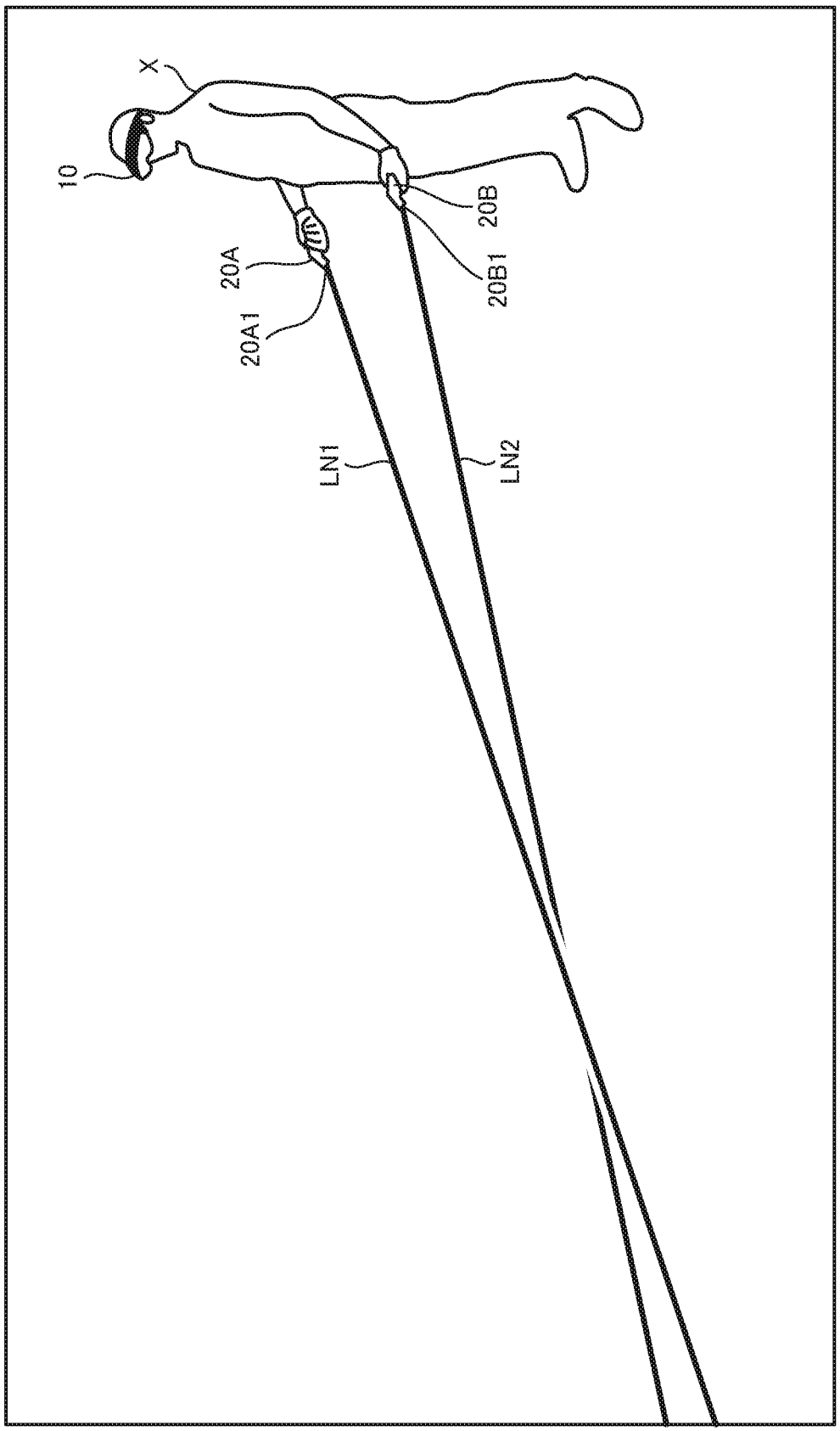
FIG. 8 is a view illustrating an example of an origin setting process.

FIG. 8 is a view illustrating an example of the origin setting process. FIG. 8 illustrates a case where the user X carries the first controller 20A as the master instruction component in the right hand as the dominant hand, and carries the second controller 20B as the slave instruction component in the left hand. Note that the second controller 20B carried by the user X in the left hand may be the master instruction component, and the first controller 20A carried by the user X in the right hand may be the slave instruction component.

As illustrated in FIG. 8, for example, the origin setting process is a process of setting an origin 20A1 of the main line LN1 in the first direction pointing in the predetermined space using the first controller 20A and an origin 20B1 of the sub line LN2 in the second direction pointing in the predetermined space using the second controller 20B. The position of the first controller 20A pointing to the first direction is assumed as the origin 20A1 of the main line LN1, and the position of the second controller 20B pointing to the second direction is assumed as the origin 20B1 of the sub line LN2.

The main line LN1 extends from the first controller 20A along an axis passing through the origin 20A1 of the first controller 20A. Furthermore, the sub line LN2 extends from the second controller 20B along an axis passing through the origin 20B1 of the second controller 20B. For example, the information processing device 30 calculates the main line LN1 on the basis of the position and orientation of the first controller 20A, and calculates the sub line LN2 on the basis of the position and orientation of the second controller 20B. The information processing device 30 calculates the main line LN1 on the basis of the axis of the first controller 20A and the origin 20A1, and calculates the sub line LN2 on the basis of the axis of the second controller 20B and the origin 20B1.

Figure 9:
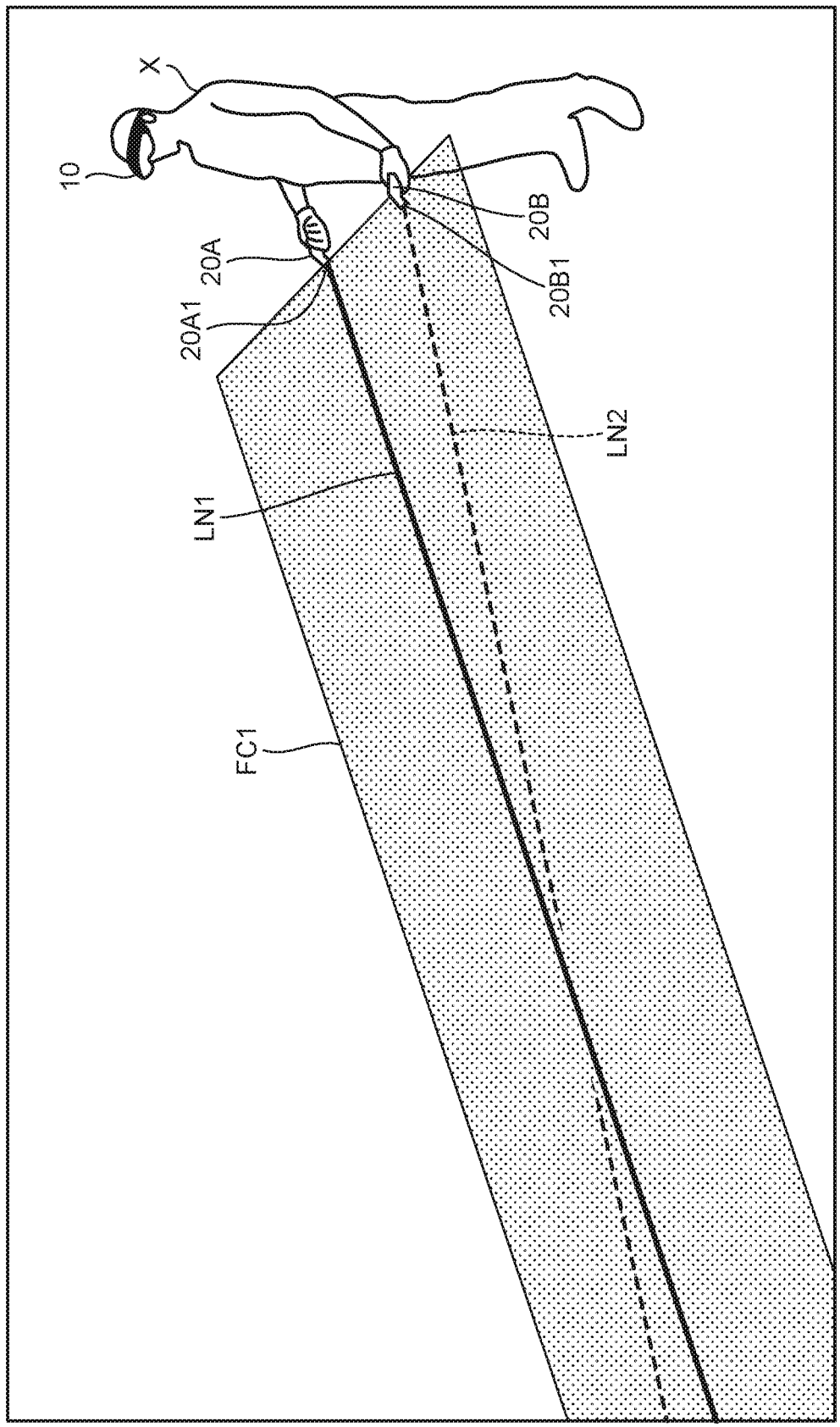
FIG. 9 is a view illustrating an example of a reference plane setting process.

FIG. 9 is a view illustrating an example of the reference plane setting process. As illustrated in FIG. 9, the reference plane setting process is a process of setting a reference plane. A plane formed by the main line LN1 and the origin 20B1 of the sub line LN2 is assumed as a reference plane FC1. The reference plane FC1 is a plane including the main line LN1 and the origin 20B1 of the sub line LN2. In other words, the main line LN1 passes through the reference plane FC1, and the origin 20B1 is located in the reference plane FC1. In this manner, the reference plane FC1 is determined by the main line LN1 and the origin 20B1 of the sub line LN2. For example, the information processing device 30 calculates the reference plane FC1 on the basis of the position of the main line LN1 and the position of the origin 20B1. The information processing device 30 calculates the plane including the main line LN1 and the origin 20B1 of the sub line LN2 as the reference plane FC1.

Note that the reason for setting the reference plane FC1 is that, for example, in a case where the ground or floor is fixed to the reference plane FC1 when the two controllers 20 are operated in a direction perpendicular to the floor (such as right above or right below), the intersection P is to be created from the angle in a direction horizontal to the floor, and thus the intersection P cannot be created at the position assumed by the user X. Accordingly, the plane formed by the main line LN1 and the origin 20B1 of the sub line LN2 is set as the reference plane FC1.

Figure 10:
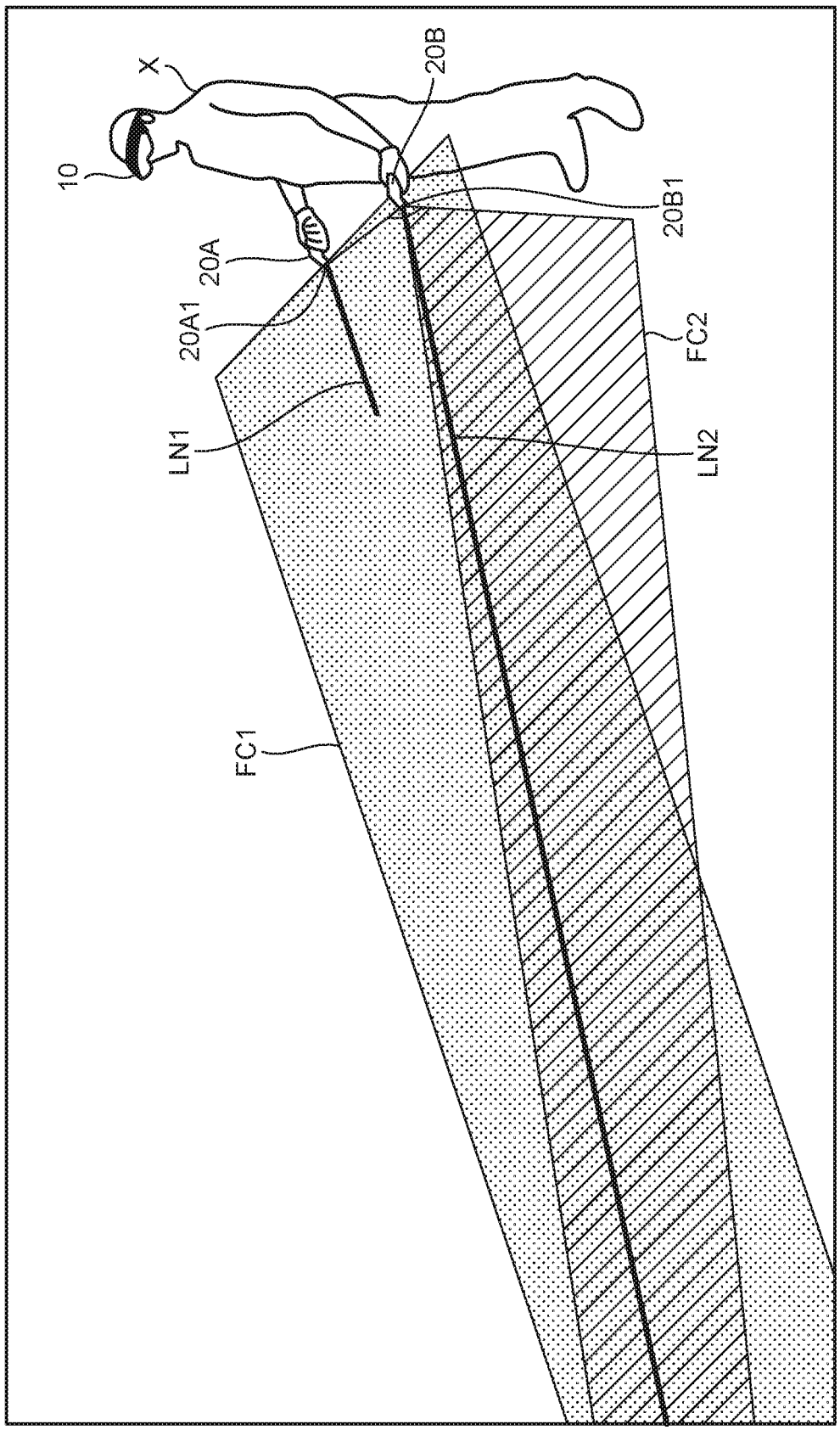
FIG. 10 is a view illustrating an example of an operation plane setting process.

FIG. 10 is a view illustrating an example of the operation plane setting process. As illustrated in FIG. 10, the operation plane setting process is a process of setting an operation plane FC2. A plane to which the reference plane FC1 is perpendicular with the origin 20B1 of the sub line LN2 being the center is assumed as the operation plane FC2. The operation plane FC2 is a plane that passes through the origin 20B1 and is orthogonal to the reference plane FC1. Furthermore, the sub line LN2 moves on the operation plane FC2. The sub line LN2 rides on the operation plane FC2. In other words, the sub line LN2 passes through the operation plane FC2. That is, the operation plane FC2 is a plane including the origin 20B1 of the sub line LN2 and orthogonal to the reference plane FC1. The operation plane FC2 is determined by the reference plane FC1 and the origin 20B1 of the sub line LN2. For example, the information processing device 30 calculates the operation plane FC2 on the basis of the position of the reference plane FC1, the position of the sub line LN2, and the position of the origin 20B1. The information processing device 30 calculates a plane orthogonal to the reference plane FC1 and including the sub line LN2 and the origin 20B1 as the operation plane FC2. A plane to which the reference plane FC1 is perpendicular with the origin 20B1 of the sub line LN2 being the center, the plane on which the sub line LN2 moves and which includes the sub line LN2 and perpendicular to the reference plane FC1, is assumed as the operation plane FC2 diagram.

Figure 11:
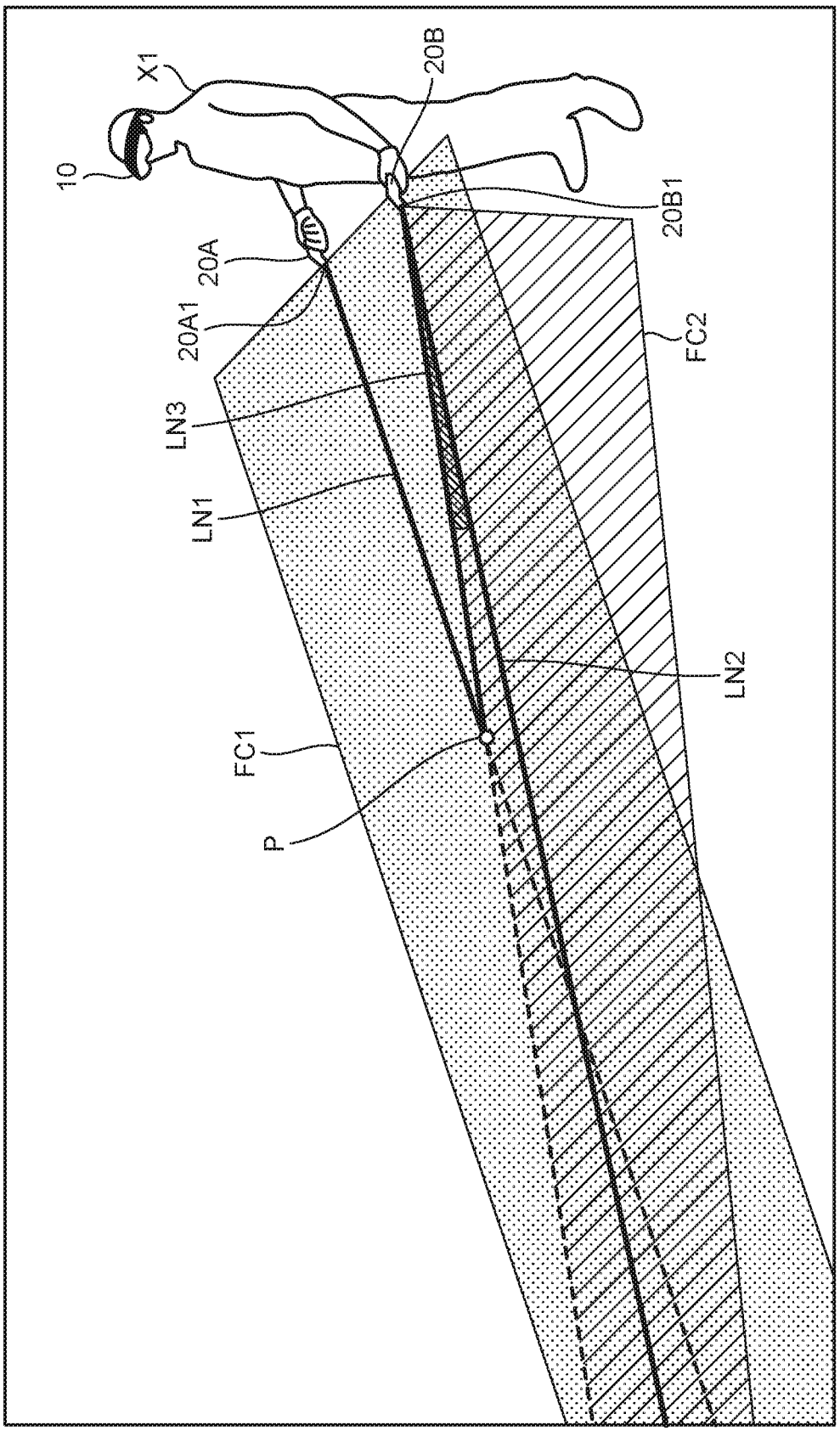
FIG. 11 is a view illustrating an example of an intersection setting process.

FIG. 11 is a view illustrating an example of the intersection setting process. As illustrated in FIG. 11, the intersection setting process is a process of setting a point at which the main line LN1 and the operation plane FC2 intersect as the intersection P. The point at which the main line LN1 and the operation plane FC2 intersect is assumed as the intersection P. The information processing device 30 calculates the intersection P on the basis of the position of the main line LN1 and the position of the operation plane FC2. For example, the information processing device 30 calculates the point at which the main line LN1 and the operation plane FC2 intersect as the intersection P. Note that a line connecting the origin 20B1 of the sub line LN2 and the intersection P is assumed as the operation line LN3, and an angle formed by the operation line LN3 and the main line LN1 is assumed as the operation angle θ.

FIG. 12 is a view illustrating an example of a relationship between the main line LN1 and the operation line LN3. The main line LN1 illustrated in FIG. 12 is a line in the first direction pointed by the main controller 20. The operation line LN3 is a line in the second direction pointed by the sub controller 20. The distance between the main controller 20 on the main line LN1 and the virtual object α is assumed as d, the distance between the main controller 20 on the main line LN1 and the intersection P is assumed as D0, and the distance between the intersection P0 on the main line LN1 and the virtual object α is assumed as D1. An angle formed by the main line LN1 and the operation line LN3 is assumed as θ0. An intersection between the main line LN1 and the operation line LN3 at a reference time is assumed as P0, and an angle θ0 formed by the main line LN1 and the operation line LN3 is assumed as a reference angle. Further, an intersection between the main line LN1 and the operation line LN3 in a case where the operation line LN3 changes according to the operation of the sub controller 20 is assumed as P, and an angle θ formed by the main line LN1 and the operation line LN3 is assumed as an operation angle.

<3-2. Gripping Process of Virtual Object>

Figure 13:
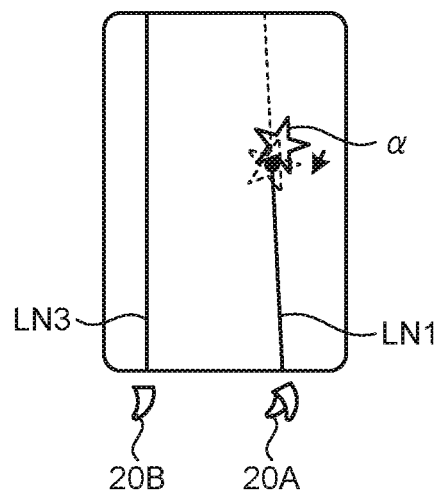
FIG. 13 is a view illustrating an example of a gripping process (without an intersection) of a virtual object.

The gripping process of a virtual object is a process of gripping the virtual object α on the main line LN1. FIG. 13 is a view illustrating an example of the gripping process (without an intersection) of the virtual object α. In the gripping process illustrated in FIG. 13, for example, in a case where there is no intersection, when the main trigger is pressed with the main line LN1 abutting on the virtual object α, the virtual object α is arranged ahead on the main line LN1. Note that the main trigger is, for example, an operation unit of the first controller 20A of the main line LN1. Also, in a case where the main trigger is not pressed, the line remains as it is. Further, even in a case where the main trigger is pressed when it is directed to a place where there is no virtual object α, the line remains as it is. Furthermore, also in a case where only the sub trigger is pressed, nothing happens. The sub trigger is, for example, an operation unit of the second controller 20B of the operation line LN3.

Figure 14:
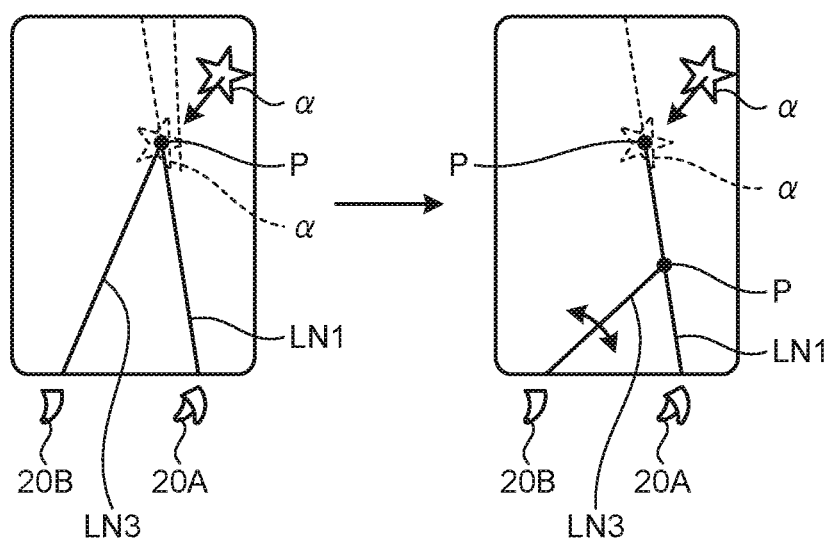
FIG. 14 is views illustrating an example of the gripping process (with an intersection) of the virtual object.

On the other hand, FIG. 14 is a view illustrating an example of the gripping process (with an intersection) of the virtual object α. In the gripping process illustrated in FIG. 14, for example, in a case where the intersection P formed by the main line LN1 and the operation line LN3 is on the main line LN1, when the main trigger is pressed, the virtual object α is attracted to the intersection P in a case where the intersection P on the main line LN1 and the virtual object α are within a certain distance. On the other hand, in a case where the intersection P on the main line LN1 and the virtual object α are separated from each other by more than a certain distance, the virtual object α is not attracted. Further, in a case where the main trigger is not pressed, the line remains as it is. Furthermore, even in a case where only the sub trigger is pressed, nothing happens. In a case where the main and sub triggers are simultaneously pressed, the virtual object α is attracted to the intersection P on the main line LN1. Furthermore, even in a case where the main trigger is pressed while the sub trigger is being pressed, the behavior is the same as the simultaneous pressing of the main and sub triggers.

<3-3. Moving Process of Virtual Object>

Figure 15:
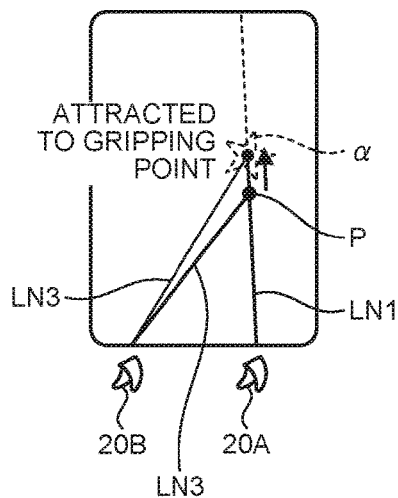
FIG. 15 is a view illustrating an example of a moving process of the virtual object (distance D1 is less than a threshold).

As illustrated in FIG. 15, the moving process of the virtual object α is a process of moving the virtual object α arranged on the main line LN1 in the depth direction according to the operation of the second controller 20B. In a state where the virtual object α is arranged beyond the main line LN1 in a state where the main trigger is being pressed, the operation line LN3 is moved on the main line LN1 according to the operation of the second controller 20B to change the intersection P. When the sub trigger is pressed, it is determined whether or not the distance D1 between the intersection P and the virtual object α at that time is less than the threshold Dth.

FIG. 15 is a view illustrating an example of the moving process of the virtual object α (the distance D1 is less than the threshold Dth). In a case where the distance D1 between the intersection P and the virtual object α is less than the threshold Dth, that is, in a case where the operation target is in the vicinity, the virtual object α on the main line LN1 is attracted to the intersection P as illustrated in FIG. 15, and the distance D1 becomes "0". Then, the operation line LN3 moves on the main line LN1 according to the operation of the second controller 20B, and the intersection P moves according to the operation line LN3 after the movement, so that the virtual object α moves on the main line LN1 according to the movement of the intersection P.

Figure 16:
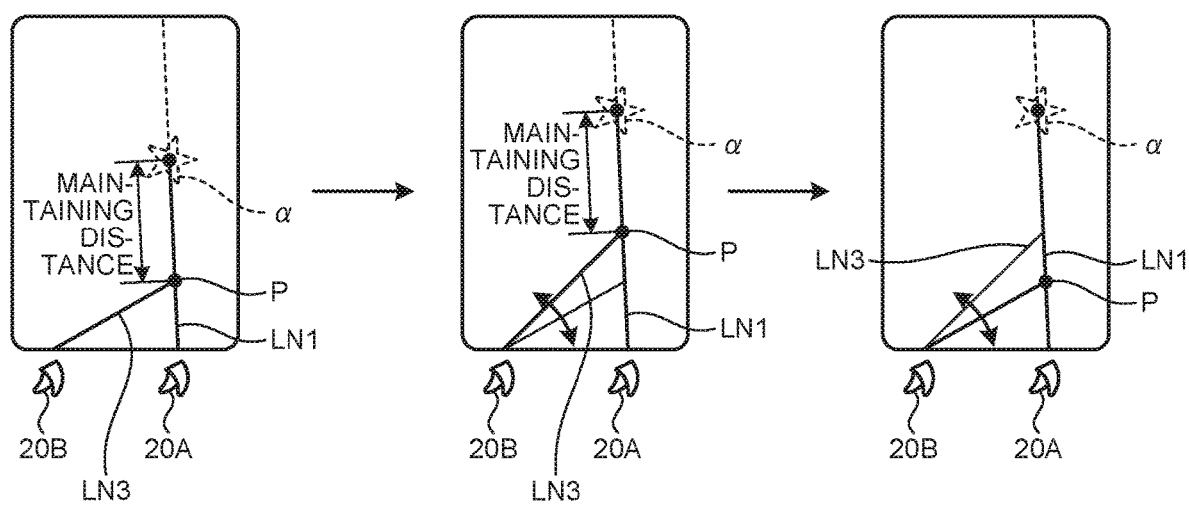
FIG. 16 is views illustrating an example of the moving process of the virtual object (distance D1 is equal to or more than the threshold).

FIG. 16 is views illustrating an example of the moving process of the virtual object α (the distance D1 is equal to or more than the threshold Dth). In a case where the distance D1 between the intersection P and the virtual object α is equal to or more than the threshold Dth, that is, in a case where the operation target is at a distant place, the distance D1 between the virtual object α and the intersection P is "D1>0" as illustrated in FIG. 16. Then, the operation line LN3 moves on the main line LN1 according to the operation of the second controller 20B, the intersection P moves according to the operation line LN3 after the movement, and the virtual object α and the intersection P move on the main line LN1 while maintaining the distance between the virtual object α and the intersection P. Note that the distance D1 between the intersection P and the virtual object α at the time point when the sub trigger is pressed is held. Since a distant operation target can be operated at hand, it is possible to perform adjustment while confirming a distance to be finely adjusted.

Figure 17:
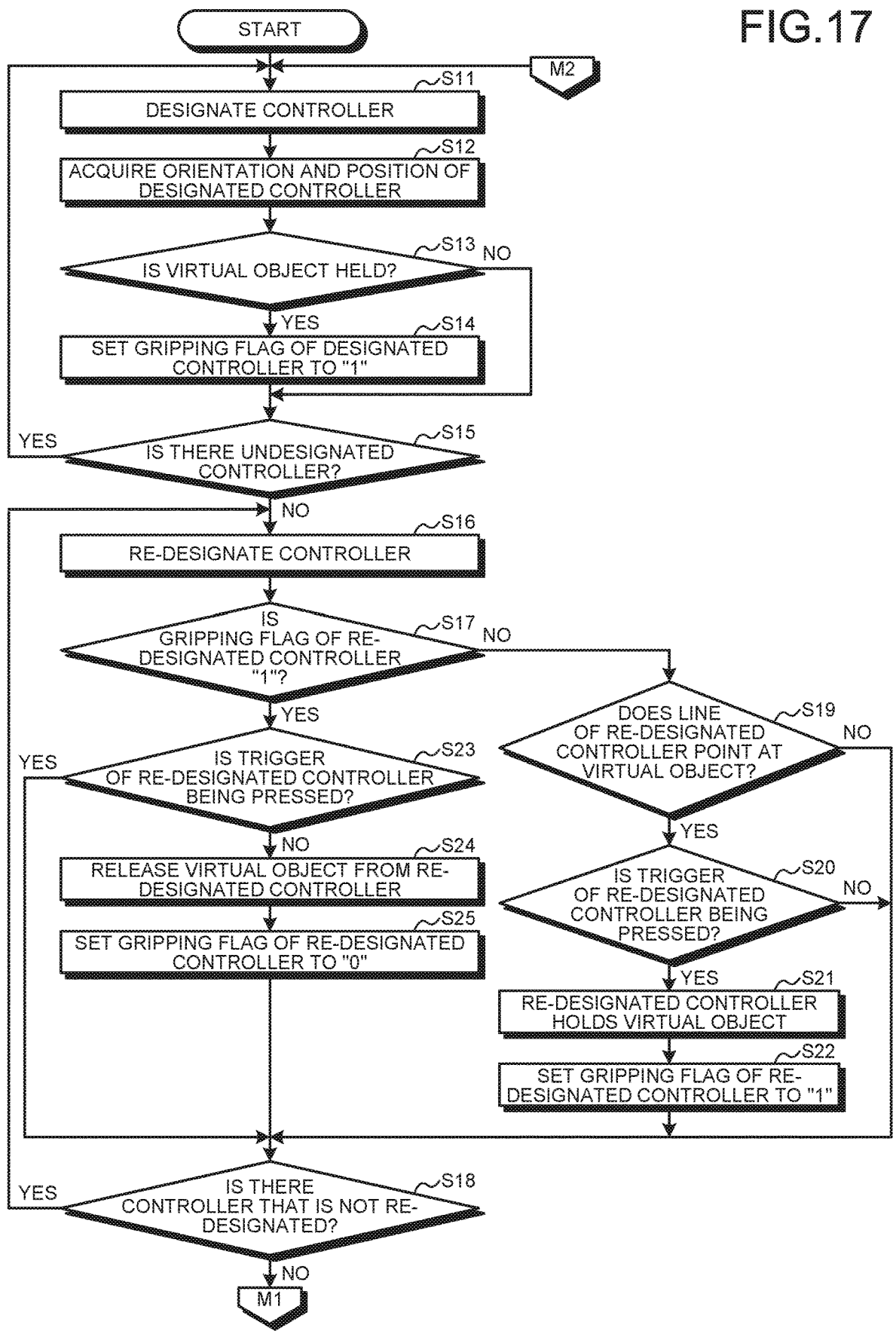
FIG. 17 is a flowchart illustrating an example of processing operation of the information processing device related to the moving process.
Figure 18:
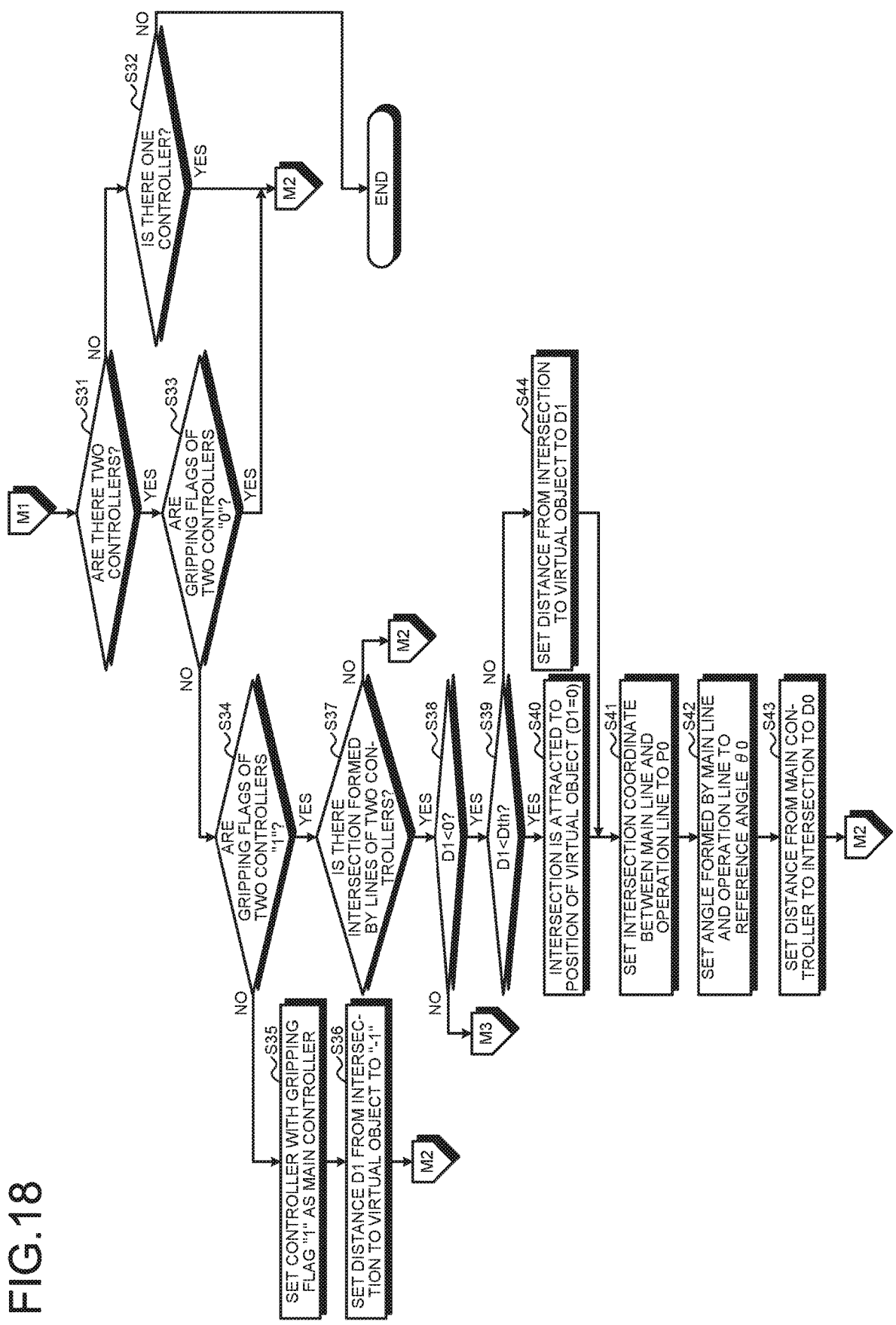
FIG. 18 is a flowchart illustrating an example of the processing operation of the information processing device related to the moving process.
Figure 19:
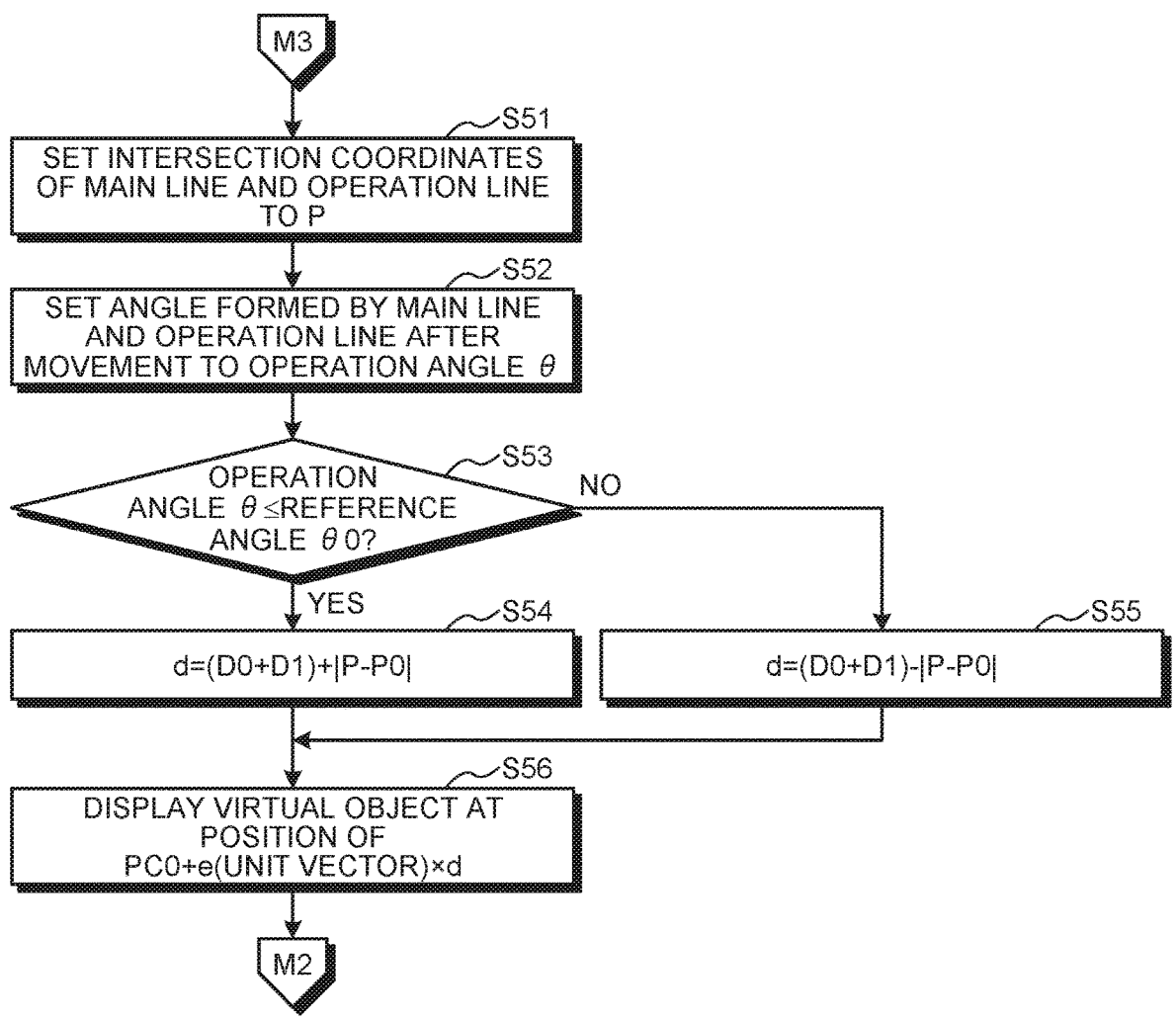
FIG. 19 is a flowchart illustrating an example of the processing operation of the information processing device related to the moving process.

FIGS. 17 to 19 are flowcharts illustrating an example of processing operation of the information processing device 30 related to the moving process. The control unit 60 designates one controller 20 among the plurality of controllers 20 (Step S11), and acquires the orientation and position of the designated controller 20 (Step S12). The control unit 60 determines whether or not the virtual object α in the predetermined space is gripped by the designated controller 20 (Step S13). In a case where the virtual object α in the predetermined space is gripped (Step S13: Yes), the control unit 60 sets the gripping flag of the designated controller 20 to "1" (Step S14) and determines whether or not there is an undesignated controller 20 (Step S15). The control unit 60 stores "1" in the gripping flag corresponding to the direction ID for identifying the line LN of the designated controller 20 stored in the direction information storage unit 51.

In a case where there is an undesignated controller 20 (Step S15: Yes), the control unit 60 proceeds to Step S11 to designate the controller 20. Furthermore, in a case where the designated controller 20 does not grip the virtual object α (Step S13: No), the control unit 60 proceeds to Step S15 to determine whether or not there is an undesignated controller 20.

In a case where there is an undesignated controller 20 (Step S15: Yes), the control unit 60 re-designates one controller 20 among the plurality of designated controllers 20 (Step S16). The control unit 60 determines whether or not the gripping flag of the re-designated controller 20 is "1" (Step S17). The control unit 60 refers to the gripping flag corresponding to the direction ID for identifying the line LN of the re-designated controller 20 stored in the direction information storage unit 51, and determines whether or not the gripping flag is "1". In a case where the gripping flag of the re-designated controller 20 is "1" (Step S17: Yes), the control unit 60 determines whether or not the trigger of the re-designated controller 20 is being pressed (Step S23). In a case where the trigger of the re-designated controller 20 is being pressed (Step S23: Yes), the control unit 60 determines whether or not there is a controller 20 that has not been re-designated yet among the plurality of designated controllers 20 (Step S18). In a case where there is no controller 20 that has not been re-designated yet (Step S18: No), the control unit 60 proceeds to M1 illustrated in FIG. 18. Furthermore, in a case where the trigger of the re-designated controller 20 is not being pressed (Step S23: No), the control unit 60 releases the virtual object α from the re-designated controller 20 (Step S24), sets the gripping flag of the re-designated controller 20 to "0" (Step S25), and proceeds to Step S18.

In a case where there is a controller 20 that has not been re-designated yet (Step S18: Yes), the control unit 60 proceeds to Step S16 to re-designate the controller 20.

In a case where the gripping flag of the re-designated controller 20 is not "1" (Step S17: No), the control unit 60 determines whether or not a line in the direction pointed by the re-designated controller 20 points at the virtual object α in the predetermined space (Step S19). In a case where the virtual object α is pointed (Step S19: Yes), the control unit 60 determines whether or not the trigger of the re-designated controller 20 pointing at the virtual object α in the predetermined space is being pressed (Step S20). Note that the control unit 60 determines, for example, whether or not the trigger of the first controller 20A is being pressed in a state where the first controller 20A points at the virtual object α.

In a case where the trigger of the re-designated controller 20 is being pressed (Step S20: Yes), the control unit 60 causes the re-designated controller 20 to hold the virtual object α (Step S21), sets the gripping flag of the re-designated controller 20 to "1" (Step S22), and proceeds to Step S18 to determine whether or not there is a controller 20 that has not been re-designated yet.

In a case where the virtual object α is not pointed (Step S19: No) or in a case where the trigger of the re-designated controller 20 is not being pressed (Step S20: No), the control unit 60 proceeds to Step S18 to determine whether or not there is a controller 20 that has not been re-designated yet.

In M1 illustrated in FIG. 18, the control unit 60 determines whether or not there are two controllers 20 (Step S31). In a case where the number of the controllers 20 is not two (Step S31: No), the control unit 60 determines whether or not there is one controller 20 (Step S32). In a case where there is one controller 20 (Step S32: Yes), the control unit 60 proceeds to M2 illustrated in FIG. 17. Furthermore, in a case where the number of the controllers 20 is not one (Step S32: No), the control unit 60 ends the processing operation illustrated in FIG. 18.

In a case where there are two controllers 20 (Step S31: Yes), the control unit 60 determines whether or not the gripping flags of the two controllers 20 are "0" (Step S33).

In a case where both the gripping flags of the two controllers 20 are "0" (Step S33: Yes), the control unit 60 proceeds to M2 illustrated in FIG. 17.

In a case where the gripping flags of the two controllers 20 are not "0", the control unit 60 determines whether or not the gripping flags of the two controllers 20 are "1" (Step S34). In a case where the gripping flags of the two controllers 20 are not "1" (Step S34: No), that is, the control unit 60 determines that the gripping flag of one of the controllers 20 is "1", and sets the controller 20 having the gripping flag "1" as the main controller 20 (Step S35). Note that the control unit 60 changes the master-slave relationship 53C stored in the intersection information storage unit 53 to "present", stores "20A" in the master instruction component 53D, and stores "20B" in the slave instruction component 53E. The control unit 60 sets the distance D1 between the intersection P on the main line LN1 of the main controller 20 and the virtual object α to "−1" (Step S36), and proceeds to M2 illustrated in FIG. 17.

In a case where the gripping flags of the two controllers 20 are "1" (Step S34: Yes), the control unit 60 determines whether or not there is an intersection on the main line LN1 at which two lines of the controllers 20, that is, the main line LN1 the operation line LN3 intersect (Step S37). In a case where there is an intersection on the main line LN1 (Step S37: Yes), the control unit 60 determines whether or not the distance D1 between the intersection and the virtual object α is "0" or more (Step S38).

In a case where the distance D1 between the intersection and the virtual object α is "0" or more (Step S38: Yes), the distance determination unit 64 in the control unit 60 determines whether or not the distance D1 is equal to or less than the threshold Dth (Step S39). In a case where the distance D1 is equal to or less than the threshold Dth (Step S39: Yes), the control unit 60 sets "0" to the distance D1 by the intersection being attracted to the position of the virtual object α (Step S40).

The setting unit 63 in the control unit 60 sets the intersection coordinates of the main line LN1 and the operation line LN3 to P0 (Step S41), sets the angle formed by the main line LN1 and the operation line LN3 to θ0 as the reference angle (Step S42), sets the distance between the main controller 20 and the intersection to D0 (Step S43), and proceeds to M2 illustrated in FIG. 17.

Furthermore, in a case where the distance D1 is not equal to or less than the threshold Dth (Step S39: No), the setting unit 63 in the control unit 60 sets the distance between the intersection and the virtual object α to D1 (Step S44), and proceeds to Step S41 to set the intersection coordinates of the main line LN1 and the operation line LN3 to P0.

Furthermore, in a case where the distance D1 between the intersection and the virtual object α is not "0" or more (Step S38: No), the control unit 60 proceeds to M3 illustrated in FIG. 19.

At M3 illustrated in FIG. 19, the control unit 60 sets the intersection coordinates of the main line LN1 and the operation line LN3 to P (Step S51), and sets the angle formed by the main line LN1 and the operation line LN3 after movement to θ as an operation angle (Step S52). The determination unit 65 in the control unit 60 determines whether or not the operation angle θ is equal to or less than the reference angle θ0 (Step S53).

In a case where the operation angle θ is equal to or less than the reference angle θ0 (Step S53: Yes), the display control unit 66 in the control unit 60 calculates the distance d between the main controller 20 and the virtual object α by (D0+D1)+|P−P0| (Step S54). Note that, in a case where the distance D1 is equal to or less than the threshold Dth, since D1=0, the distance from the main controller 20 to the virtual object α on the main line LN1 becomes long by the movement amount of |P−P0| according to the change in the operation line LN3. That is, the virtual object α in the vicinity moves to the far side on the main line LN1. On the other hand, in a case where the distance D1 is not equal to or less than the threshold Dth, since D1 is an actual measurement value, the distance to the virtual object α on the main line LN1 becomes long by the movement amount of |P−P0| according to the change in the operation line LN3 while maintaining the distance between the intersection and the virtual object α. That is, the distant virtual object α moves to the far side on the main line LN1.

Moreover, in a case where the operation angle θ is not equal to or less than the reference angle θ0 (Step S53: No), the display control unit 66 in the control unit 60 calculates the distance d between the main controller 20 and the virtual object α by (D0+D1)−|P−P0| (Step S55). Note that, in a case where the distance D1 is equal to or less than the threshold Dth, since D1=0, the distance from the main controller 20 to the virtual object α on the main line LN1 becomes short by the movement amount of |P−P0| according to the change in the operation line LN3. That is, the virtual object α in the vicinity moves to the near side on the main line LN1. On the other hand, in a case where the distance D1 is not equal to or less than the threshold Dth, since D1 is an actual measurement value, the distance to the virtual object α on the main line LN1 becomes short by the movement amount of |P−P0| according to the change in the operation line LN3 while maintaining the distance between the intersection and the virtual object α. That is, the distant virtual object α moves to the near side on the main line LN1.

Then, the control unit 60 displays the virtual object α at the position of the PC0+unit vector e×d by using the distance d between the main controller 20 and the virtual object a calculated in Step S54 or Step S55 (Step S56), and proceeds to M2 illustrated in FIG. 17. Consequently, the virtual object α is displayed at a position obtained by adding the distance multiplied by the unit vector e and the distance d from the origin coordinate PC0 of the main controller 20.

<3-4. Releasing Process of Virtual Object>

The releasing process of the virtual object α is a process of arranging the position of the virtual object α adjusted on the main line LN1. The position of the virtual object α is adjusted on the main line LN1 in response to the change operation of the operation line LN3 while the main trigger is being pressed. Further, when the main trigger is released, the virtual object α at the current position on the main line LN1 is arranged. Furthermore, when the sub trigger is released while the main trigger is being pressed, the virtual object α is fixed to the position of the virtual object α at the time point when the sub trigger is released. Furthermore, when the main trigger is released while the sub trigger is being pressed, the virtual object α is fixed to the current position of the virtual object α at the time point when the main trigger is released.

4. Effects of Embodiment

In a case where the distance D1 is equal to or more than the threshold Dth, the control unit 60 determines whether or not the operation angle θ acquired in response to the change of the operation line LN3 is equal to or more than the reference angle θ0 while maintaining the distance D1. In a case where the operation angle θ is equal to or more than the reference angle θ0, the control unit 60 moves the virtual object α and the intersection P to the near side in the depth direction on the main line LN1 while maintaining the distance D1, and causes the display unit 15 to display the virtual object α and the intersection P. At this time, the control unit 60 causes the virtual object α to be displayed on the main line LN1 of the coordinates (coordinates on the near side) obtained by the origin PC0+e (unit vector)×d of the main line LN1. Consequently, while maintaining the distance between the virtual object α and the intersection, the position of the distant virtual object α can be finely adjusted to the near side at a hand position where the operation is easy.

In a case where the operation angle θ is less than the reference angle θ0, the control unit 60 moves the virtual object α and the intersection P to the depth side in the depth direction on the main line LN1 while maintaining the distance D1, and causes the display unit 15 to display the virtual object α and the intersection P. At this time, the control unit 60 causes the virtual object α to be displayed on the main line LN1 of the coordinates (coordinates on the far side) obtained by the origin PC0+e (unit vector)×d of the main line LN1. Consequently, the position of the distant virtual object α can be finely adjusted to the far side at the hand position where the operation is easy while the distance between the virtual object α and the intersection is secured.

The virtual object α can be moved by the movement distance while the trigger is being pressed by using a metaphor of holding and releasing the virtual object α. Furthermore, the virtual object α can be moved either far or near depending on the moving direction of the virtual object α.

In addition, each trigger of the two controllers 20 can be used to finely adjust the position of a distant intersection or the virtual object α so as to allow operating at hand. Moreover, the position of the distant virtual object α can be adjusted by a series of movements without re-holding or putting down the controller 20.

5. Modification Example

Furthermore, environment recognition is performed, and a target that can be operated is limited or determined in advance. In a case where the operation target is limited, when the line approaches or touches the virtual object α, it may change to an expression or state of attracting or gripping so that the user can easily understand the operation target. In a case of operating a distant virtual object α, it is difficult to understand the situation, positional relationship, and the like in the vicinity of the virtual object α as the operation target, and thus a camera image in the vicinity of the operation target unit may be presented together as a monitor screen (another window) near the operation unit at hand. Alternatively, the operator may virtually move near the operation target and operate the virtual object α.

<5-1. Other Releasing Processes of Virtual Object>

In a case where the virtual object α is separated from the line, it may be executed by an operation accompanied by a rapid change in acceleration, such as shaking, swinging, or throwing the controller 20, so that the user can easily image that the virtual object α is separated.

<5-2. Other Gripping Processes of Virtual Object>

For example, the intersection generating process and the gripping process of the virtual object α may be executed according to, for example, a trigger press, a specific gesture (examples include putting hands together, sticking out, and the like), or a context (when the application enters a selection mode). Furthermore, termination of the intersection creation process or the virtual object may be executed, for example, in a timeout.

<5-3. Other Moving Processes of Virtual Object>

The intersection position and the position of the virtual object α are adjusted by two lines, but one line may be fixed in a direction at a certain time point (for example, this may be specified by uttering "now" or the like in a voice). Different modals such as a line of sight and finger pointing may be combined, and an operation by a plurality of persons, such as operating two lines by two persons, may be performed.

Further, when fine adjustment is performed at hand, for example, feedback indicating a sense of distance by sound, vibration, or the like may be input every specific distance in units of 10 cm. The distance from the user position to the virtual object α may be read aloud.

Figure 20:
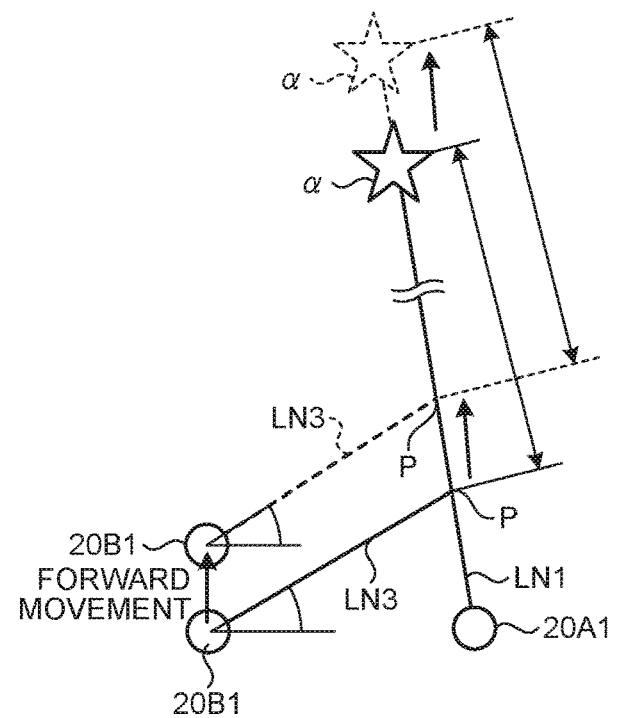
FIG. 20 is a view illustrating an example of a movement position of the virtual object at a time of forward movement of the operation line.

Furthermore, in the present embodiment, the intersection position may be changed by an operation of sending or returning the intersection position by fixing the operation angle as the reference angle without changing the angle, for example, front-back movement or left-right movement of the hand, and the position of the virtual object α may be changed in conjunction. FIG. 20 is a view illustrating an example of the movement position of the virtual object α at a time of forward movement of the operation line LN3. As illustrated in FIG. 20, in a case where the operation line LN3 is moved forward, the virtual object α on the main line LN1 is moved forward (far side). On the other hand, in a case where the operation line LN3 is moved backward, the virtual object α on the main line LN1 is moved backward (near side).

Figure 21:
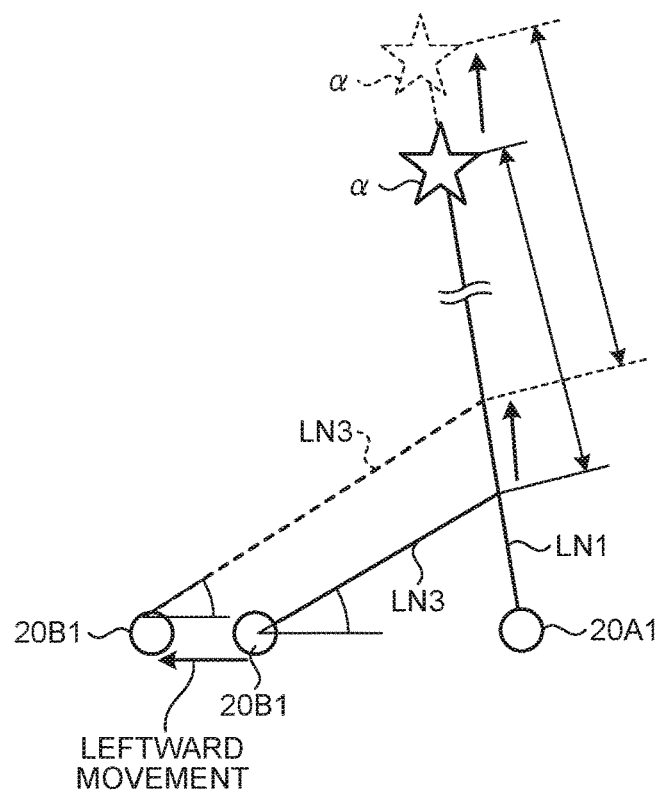
FIG. 21 is a view illustrating an example of a movement position of the virtual object at a time of leftward movement of the operation line.

FIG. 21 is a view illustrating an example of the movement position of the virtual object α at a time of leftward movement of the operation line LN3. As illustrated in FIG. 21, in a case where the operation line LN3 is moved leftward, the virtual object α on the main line LN1 is moved forward (far side). On the other hand, in a case where the operation line LN3 is moved rightward, the virtual object α on the main line LN1 is moved backward (near side).

The case has been exemplified in which, in a case where the operation angle θ is equal to or more than the reference angle θ0, the control unit 60 of the present embodiment causes the virtual object α and the intersection P to move to the near side in the depth direction on the main line LN1 and be displayed on the display unit 15 while maintaining the distance D1. However, in a case where the operation angle θ is equal to or more than the reference angle θ0, the control unit 60 moves the virtual object α and the intersection P to the far side in the depth direction on the main line LN1 while maintaining the distance D1, and causes the display unit 15 to display the virtual object α and the intersection P. Furthermore, in a case where the operation angle θ is less than the reference angle θ0, the control unit 60 may move the virtual object α and the intersection P to the near side in the depth direction on the main line LN1 while maintaining the distance D1, and cause the display unit 15 to display the virtual object α and the intersection P, which can be appropriately changed.

<5-4. Other Instruction Components>

Although the first controller 20A and the second controller 20B have been exemplified as the instruction components, another device, the body (hand or eye) of the user or the like may be used instead of the device such as the controller 20. For example, the controller 20 and the line of sight of the eyes of the user X may be the instruction component.

The instruction component is not limited to the above, and may be various elements such as a palm, an arm, and a front of a face or a head. That is, ones that emit a line include various objects capable of indicating a direction, such as a controller, a finger, a hand, a palm, an arm, a line of sight, and a front of a face or head.

<5-5. Other Display Forms of Virtual Object>

For example, in order to facilitate understanding of weight and characteristics of the virtual object α, movement of a line or expression of the virtual object α indicating inertia or reaction force may be performed. In order to make it easy to understand that the virtual object α overlaps or collides with another virtual object α or an object in the real world, an expression in which a line or the virtual object α bends or flicks may be added. In a case where the virtual object α cannot move deeper in the depth direction, an expression in which the virtual object α collides and is pressed may be incorporated in the line or the virtual object α.

In a case where the position of the virtual object α is moving, the information processing device 30 controls the display unit 15 to change and display the display mode of the virtual object α. For example, in a case where the virtual object α is moved and arranged, the information processing device 30 may weaken the display of the virtual object α being moved. For example, the information processing device 30 weakens the display of the moving virtual object α by increasing the transmittance of the virtual object α being moved. As described above, when the virtual object α is moved and arranged, by weakening the display of the virtual object α being moved, the user X can move the virtual object α while confirming the arrangement and positional relationship with the object in the real world or the virtual object α arranged around the object.

Furthermore, for example, in a case where the virtual object α is moved and arranged, the information processing device 30 may enhance the display of the virtual object α being moved. In this manner, by enhancing the display of the virtual object α being moved, the user X can make the virtual object α being moved conspicuous (enhance visibility) among similar virtual objects a or easily arranged to the back.

Furthermore, as described above, various display modes may be used during the movement of the virtual object α. For example, the information processing device 30 may cause the virtual object α to be displayed as it is even while moving. The information processing device 30 displays the virtual object α as it is in a case where it is desired to arrange the virtual object α while confirming the arrangement and positional relationship with the object in the real world or the virtual object α arranged around the object.

Furthermore, for example, the information processing device 30 may weaken the display of the virtual object α being moved. For example, the information processing device 30 displays only the outline of the virtual object α or makes it translucent. The information processing device 30 displays the outline of the virtual object α or makes the virtual object α translucent in a case where it is desired to perform trajectory and position adjustment during movement while confirming the arrangement and positional relationship with the object in the real world or the virtual object α arranged around the object. For example, the information processing device 30 may turn off the display of the virtual object α. In this case, the information processing device 30 may cause only the intersection to be displayed. In a case where it is desired to emphasis the trajectory and position adjustment during movement and make it easier to see, the information processing device 30 deletes the display of the virtual object α.

Furthermore, for example, the information processing device 30 may enhance the display of the virtual object α being moved. The information processing device 30 may enhance the hue or increase the luminance value. The information processing device 30 may be combined with an additional display such as an icon. In a case where similar objects are arranged, the information processing device 30 highlights the selected virtual object α for easy recognizing. Furthermore, in a case where it is desired to arrange the virtual object α at the back of a place where the virtual objects a are arranged, the information processing device 30 suppresses the color tone of the other virtual objects and increases the transmittance, so that the arrangement at the back of the virtual objects becomes easy.

<5-6. Other Master-Slave Relationships>

Furthermore, even in a case where there is no functional difference between the two lines, the two lines may have a master-slave relationship. The information processing device 30 may determine the master-slave relationship between the instruction components by appropriately using various types of information. Furthermore, the information processing device 30 may change the color density, shape, and the like of each line in order to indicate the master-slave relationship.

The information processing device 30 may determine an instruction component estimated to be preferentially used as a main instruction component (master instruction component). For example, the information processing device 30 sets an instruction component corresponding to the user's right hand as the master instruction component. Furthermore, for example, the information processing device 30 may set one having an object (device) as the master instruction component. For example, in a case of carrying the object (device) only in one hand, the information processing device 30 may set this device as the master instruction component.

The information processing device 30 may determine the master instruction component according to a predetermined order. The information processing device 30 may determine the master instruction component according to the order of bringing into a beam state. For example, the information processing device 30 may determine the instruction component that has been first brought into a beam state as the master instruction component.

The information processing device 30 may determine the master instruction component according to the way of movement. For example, the information processing device 30 may determine an instruction component that has been moved largely or moved earlier as the master instruction component.

<5-7. Other Display Forms of Lines>

Furthermore, the representation of the lines may also be of various targets. For example, when it becomes accustomed to the operation, the display of the line becomes unnecessary, and thus only the intersection may be displayed. Furthermore, for example, the information processing device 30 may express a line so that it is easy to create an intersection when two lines are separated. For example, the information processing device 30 may increase the thickness of the line.

Note that the present invention is not limited to the above, and various display modes may be used. Although the operation in a case where there is one user has been described in the above-described example, a plurality of users (a plurality of persons) may wear the display device 10 such as an AR device, a VR device, or an MR device, and operate by a plurality of persons while viewing the same video. In this case, when one person is operating the virtual object α, the other person can adjust the position.

<5-8. Other Geometric Targets>

Note that, as described above, the geometric target is not limited to a plane (operation plane) and may be a line. In the present embodiment, a case where the intersection is created by crossing the operation line LN3 and the main line LN1 has been exemplified, but the intersection may be created by crossing, not the operation line, but the sub line LN2 and the main line LN1, which can be appropriately changed.

The information processing device 30 of the present embodiment may be implemented by a dedicated computer system or a general-purpose computer system.

6. Hardware Configuration

Figure 22:
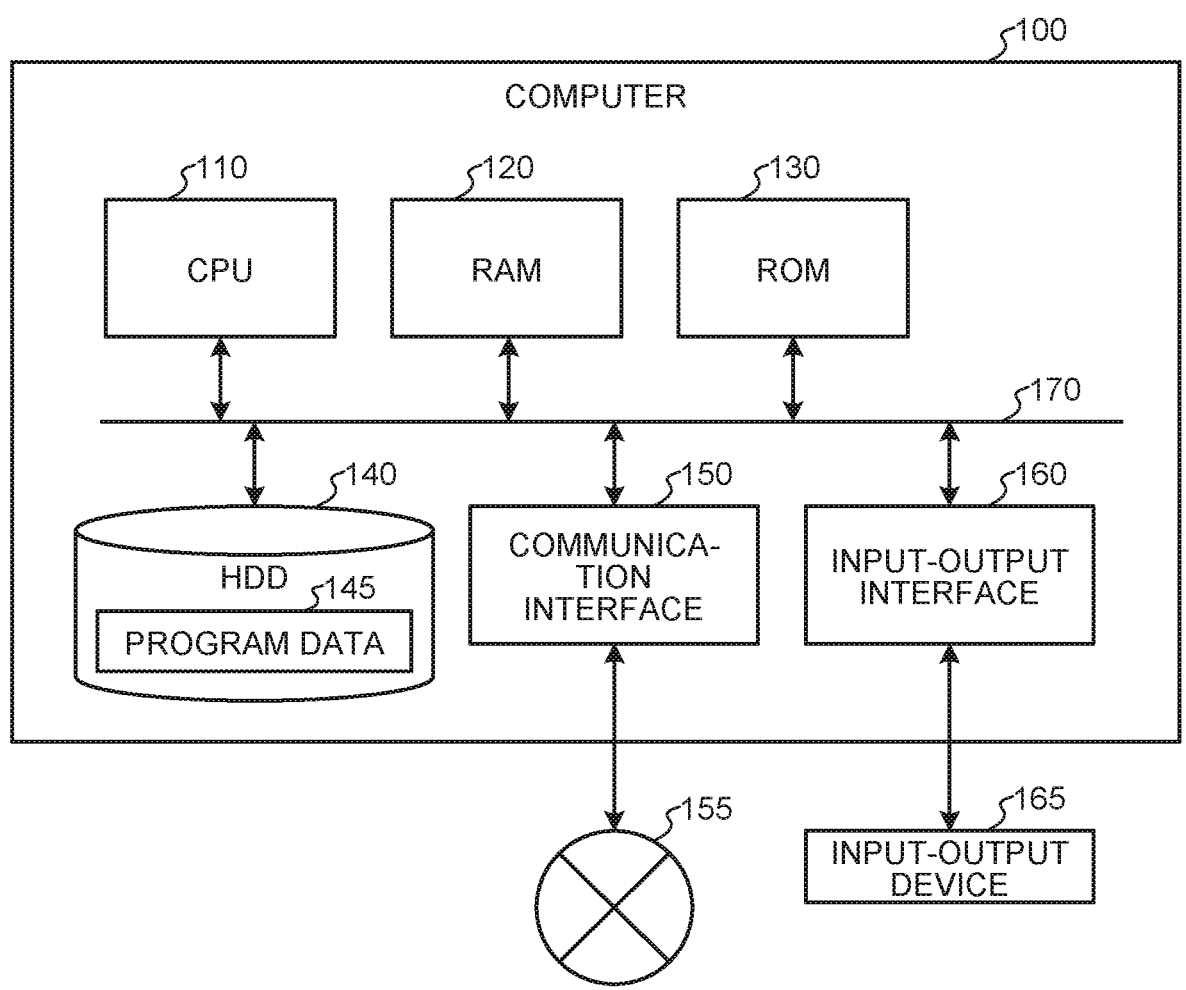
FIG. 22 is a diagram illustrating an example of the information processing device.

The information device such as the information processing device 100 according to each of the above-described embodiments and modification examples is implemented by, for example, a computer 100 having a configuration as illustrated in FIG. 22. FIG. 22 is a hardware configuration diagram illustrating an example of the computer 100 that implements the functions of the information processing device such as the information processing device 30. Hereinafter, the information processing device 30 according to the embodiment will be described as an example. The computer 100 includes a CPU 110, a RAM 120, a read only memory (ROM) 130, a hard disk drive (HDD) 140, a communication interface 150, and an input-output interface 160. Each unit of the computer 100 is connected by a bus 170.

The CPU 110 operates on the basis of a program stored in the ROM 130 or the HDD 140, and controls each unit. For example, the CPU 110 develops a program stored in the ROM 130 or the HDD 140 in the RAM 120, and executes processing corresponding to various programs.

The ROM 130 stores a boot program such as a basic input output system (BIOS) executed by the CPU 110 when the computer 100 is activated, a program depending on hardware of the computer 100, and the like.

The HDD 140 is a computer-readable recording medium that non-transiently records a program executed by the CPU 110, data used by the program, and the like. Specifically, the HDD 140 is a recording medium that records an information processing program according to the present disclosure as an example of program data 145.

The communication interface 150 is an interface for the computer 100 to connect to an external network 155 (for example, the Internet). For example, the CPU 110 receives data from another device or transmits data generated by the CPU 110 to another device via the communication interface 150.

The input-output interface 160 is an interface for connecting an input-output device 165 and the computer 100. For example, the CPU 110 receives data from an input device such as a keyboard and a mouse via the input-output interface 160. Further, the CPU 110 transmits data to an output device such as a display, a speaker, or a printer via the input-output interface 160. Furthermore, the input-output interface 160 may function as a media interface that reads a program or the like recorded in a predetermined recording medium. The medium is, for example, an optical recording medium such as a digital versatile disc (DVD) or a phase change rewritable disk (PD), a magneto-optical recording medium such as a magneto-optical disk (MO), a tape medium, a magnetic recording medium, a semiconductor memory, or the like.

For example, in a case where the computer 100 functions as the information processing device 30 according to the embodiment, the CPU 110 of the computer 100 implements the functions of the control unit 60 and the like by executing the information processing program loaded on the RAM 120. Further, the HDD 140 stores an information processing program according to the present disclosure and data in the storage unit 50. Note that the CPU 110 reads the program data 145 from the HDD 140 and executes the program data 145, but as another example, these programs may be acquired from another device via the external network 155.

For example, a program for executing the above-described operation (for example, the moving process of the virtual object α) is stored in a computer-readable recording medium such as an optical disk, a semiconductor memory, a magnetic tape, or a flexible disk and distributed. Then, for example, by installing the program in a computer and executing the above-described processing, the information processing device 30 can be configured.

Further, the program may be stored in a storage device included in another information processing device on a network such as the Internet so that the program can be downloaded to a computer. Furthermore, the above-described functions may be implemented by cooperation of an operating system (OS) and application software. In this case, a portion other than the OS may be stored in a medium and distributed, or a portion other than the OS may be stored in a server device, and downloading to a computer, or the like can be performed.

Furthermore, among the processes described in the above embodiments, all or part of the processes described as being performed automatically can be performed manually, or all or part of the processes described as being performed manually can be performed automatically by a publicly known method. Further, the processing procedure, specific name, and information including various data and parameters illustrated in the document and the drawings can be arbitrarily changed unless otherwise specified. For example, the various types of information illustrated in each figure are not limited to the illustrated information. Furthermore, in the above embodiments, there is a portion where a specific value is presented and described, but the value is not limited to the example, and another value may be used.

Further, each component of each device illustrated in the drawings is functionally conceptual, and is not necessarily physically configured as illustrated in the drawings. That is, a specific form of distribution and integration of each device is not limited to the illustrated form, and all or a part thereof can be functionally or physically distributed and integrated in any unit according to various loads, usage conditions, and the like.

Further, the above-described embodiments can be appropriately combined in a region in which the processing contents do not contradict each other. Furthermore, the order of respective steps illustrated in the flowcharts and the sequence diagrams of the above-described embodiments can be changed as appropriate.

Furthermore, for example, the present embodiment can be implemented as any configuration constituting a device or a system, for example, a processor as a system large scale integration (LSI) or the like, a module using a plurality of processors or the like, a unit using a plurality of modules or the like, a set obtained by further adding other functions to a unit, or the like (that is, a configuration of a part of the device).

Note that, in the present embodiment, the system means a set of a plurality of components (devices, modules (parts), and the like), and it does not matter whether or not all the components are in the same housing. Therefore, a plurality of devices housed in separate housings and connected via a network and one device in which a plurality of modules is housed in one housing are both systems.

Furthermore, the present embodiment can employ, for example, a configuration of cloud computing in which at least one function (for example, the acquisition unit 61, the detection unit 62, the setting unit 63, the distance determination unit 64, the determination unit 65, or the display control unit 66) is shared and processed in cooperation by a plurality of devices via a network.

7. Conclusion

As described above, an information processing device according to an embodiment of the present disclosure includes an acquisition unit that acquires an operation angle that is an angle formed by a first direction in a predetermined space pointed by a user and a second direction in the predetermined space pointed by the user, a setting unit that sets, as a reference angle, the operation angle acquired at a time point when an instruction to start moving a virtual object on a line extending in the first direction is detected, a determination unit that determines whether or not the operation angle acquired by the acquisition unit in response to a change in the second direction is equal to or more than the reference angle, and a control unit that controls a display device to move the virtual object in a depth direction on the line in the first direction and display the virtual object while maintaining a distance between an intersection where the first direction and the second direction intersect and the virtual object on the basis of a determination result of the determination unit. Consequently, while maintaining the distance between the virtual object α and the intersection, the position of the distant virtual object α can be finely adjusted at the hand position where the operation is easy.

Although the embodiments of the present disclosure have been described above, the technical scope of the present disclosure is not limited to the above-described embodiments as it is, and various modifications can be made without departing from the gist of the present disclosure. Furthermore, components of different embodiments and modification examples may be appropriately combined.

Furthermore, the effects in the embodiments described in the present description are merely examples and are not limited, and other effects may be provided.

Note that the present technology can also have the following configurations.

(1)

An information processing device including:

an acquisition unit that acquires an operation angle that is an angle formed by a first direction in a predetermined space pointed by a user and a second direction in the predetermined space pointed by the user;

a setting unit that sets, as a reference angle, the operation angle acquired at a time point when an instruction to start moving a virtual object on a line extending in the first direction is detected;

a determination unit that determines whether or not the operation angle acquired by the acquisition unit in response to a change in the second direction is equal to or more than the reference angle; and a control unit that controls a display device to move the virtual object in a depth direction on the line in the first direction and display the virtual object while maintaining a distance between an intersection where the first direction and the second direction intersect and the virtual object on a basis of a determination result of the determination unit.

(2)

The information processing device according to (1), wherein the control unit controls the display device to move the virtual object to a near side in the depth direction on the line in the first direction and display the virtual object while maintaining the distance between the intersection and the virtual object in a case where the operation angle is equal to or more than the reference angle in the determination unit.

(3)

The information processing device according to (1) or (2), wherein the control unit controls the display device to move the virtual object to a far side in the depth direction on the line in the first direction and display the virtual object while maintaining the distance between the intersection and the virtual object in a case where the operation angle is not equal to or more than the reference angle in the determination unit.

(4)

The information processing device according to (1), wherein the control unit controls the display device to move the virtual object to the far side in the depth direction on the line in the first direction and display the virtual object while maintaining the distance between the intersection and the virtual object in a case where the operation angle is equal to or more than the reference angle in the determination unit.

(5)

The information processing device according to (1) or (2), wherein the control unit controls the display device to move the virtual object to the near side in the depth direction on the line in the first direction and display the virtual object while maintaining the distance between the intersection and the virtual object in a case where the operation angle is not equal to or more than the reference angle in the determination unit.

(6)

The information processing device according to any one of (1) to (5), including:

a first distance determination unit that determines whether or not the distance between the virtual object and the intersection is equal to or more than a threshold, wherein the determination unit determines whether or not the operation angle is equal to or more than the reference angle in response to the change in the second direction in a case where the distance between the virtual object and the intersection is equal to or more than the threshold.

(7)

The information processing device according to (6), wherein the control unit controls the display device in such a manner that the intersection is attracted to a position of the virtual object in a case where the distance between the virtual object and the intersection is less than the threshold.

(8)

The information processing device according to any one of (1) to (7), wherein the second direction is, on an operation plane perpendicular to a reference plane determined by an origin of a third direction in the predetermined space pointed by the user and the first direction, a direction on an operation line through which an intersection where the third direction and the first direction intersect and the origin of the third direction pass.

(9)

The information processing device according to (1), wherein the control unit controls the display device to move the virtual object that is an operation target in the depth direction on the line in the first direction and display the virtual object while maintaining the distance between the intersection where the first direction and the second direction intersect and the virtual object, and controls the display device to display an image near the operation target in another window, on a basis of the determination result of the determination unit.

(10)

An information processing method including, by an information processing device:

acquiring an operation angle that is an angle formed by a first direction in a predetermined space pointed by a user and a second direction in the predetermined space pointed by the user;

setting, as a reference angle, the operation angle acquired at a time point when an instruction to start moving a virtual object on a line extending in the first direction is detected;

determining whether or not the operation angle acquired in response to a change in the second direction is equal to or more than the reference angle; and controlling a display device to move the virtual object in a depth direction on the line in the first direction and display the virtual object while maintaining a distance between an intersection where the first direction and the second direction intersect and the virtual object on a basis of a determination result.

(11)

An information processing program causing a computer to execute processing including:

acquiring an operation angle that is an angle formed by a first direction in a predetermined space pointed by a user and a second direction in the predetermined space pointed by the user;

setting, as a reference angle, the operation angle acquired at a time point when an instruction to start moving a virtual object on a line extending in the first direction is detected;

determining whether or not the operation angle acquired in response to a change in the second direction is equal to or more than the reference angle; and controlling a display device to move the virtual object in a depth direction on the line in the first direction and display the virtual object while maintaining a distance between an intersection where the first direction and the second direction intersect and the virtual object on a basis of a determination result.

REFERENCE SIGNS LIST

1 INFORMATION PROCESSING SYSTEM
10 DISPLAY DEVICE
15 DISPLAY UNIT
20 CONTROLLER
20A FIRST CONTROLLER
20B SECOND CONTROLLER
30 INFORMATION PROCESSING DEVICE
60 CONTROL UNIT
61 ACQUISITION UNIT
62 DETECTION UNIT
63 SETTING UNIT
64 DISTANCE DETERMINATION UNIT
65 DETERMINATION UNIT
66 DISPLAY CONTROL UNIT

The invention claimed is:

1. An information processing device, comprising:
a central processing unit (CPU) configured to:
acquire an operation angle that is an angle between a first direction in a specific space pointed by a user and a second direction in the specific space pointed by the user;
set, as a reference angle, the operation angle acquired at a time point when an instruction to start movement of a virtual object on a line, in the first direction, is detected;
determine whether the operation angle acquired in response to a change in the second direction is equal to or more than the reference angle; and
control a display device to move the virtual object in a depth direction on the line in the first direction and display the virtual object, wherein
a distance between an intersection where the first direction and the second direction intersect and the virtual object is maintained based on a determination result of the determination.

2. The information processing device according to claim 1, wherein
the CPU is further configured to control the display device to move the virtual object to a near side in the depth direction on the line in the first direction and display the virtual object, and
the distance between the intersection and the virtual object is maintained, in a case where the operation angle is equal to or more than the reference angle.

3. The information processing device according to claim 1, wherein
the CPU is further configured to control the display device to move the virtual object to a far side in the depth direction on the line in the first direction and display the virtual object, and
the distance between the intersection and the virtual object is maintained, in a case where the operation angle is not equal to or more than the reference angle.

4. The information processing device according to claim 1, wherein
the CPU is further configured to control the display device to move the virtual object to a far side in the depth direction on the line in the first direction and display the virtual object, and
the distance between the intersection and the virtual object is maintained, in a case where the operation angle is equal to or more than the reference angle.

5. The information processing device according to claim 1, wherein
the CPU is further configured to control the display device to move the virtual object to a near side in the depth direction on the line in the first direction and display the virtual object, and
the distance between the intersection and the virtual object is maintained, in a case where the operation angle is not equal to or more than the reference angle.

6. The information processing device according to claim 1, wherein the CPU is further configured to:
determine whether the distance between the virtual object and the intersection is equal to or more than a threshold, and
determine whether the operation angle is equal to or more than the reference angle in response to the change in the second direction in a case where the distance between the virtual object and the intersection is equal to or more than the threshold.

7. The information processing device according to claim 6, wherein the CPU is further configured to control the display device in such a manner that the intersection is attracted to a position of the virtual object in a case where the distance between the virtual object and the intersection is less than the threshold.

8. The information processing device according to claim 1, wherein
the second direction is, on an operation plane perpendicular to a reference plane determined by an origin of a third direction in the specific space pointed by the user and the first direction, a direction on an operation line through which an intersection where the third direction and the first direction intersect and the origin of the third direction pass.

9. The information processing device according to claim 1, wherein the CPU is further configured to:
control the display device to move the virtual object that is an operation target in the depth direction on the line in the first direction and display the virtual object, wherein
the distance between the intersection where the first direction and the second direction intersect and the virtual object is maintained; and
control the display device to display an image near the operation target in a window, based on the determination result of the determination.

10. An information processing method, comprising:
in an information processing device:
acquiring an operation angle that is an angle between a first direction in a specific space pointed by a user and a second direction in the specific space pointed by the user;
setting, as a reference angle, the operation angle acquired at a time point when an instruction to start moving a virtual object on a line extending in the first direction is detected;
determining whether the operation angle acquired in response to a change in the second direction is equal to or more than the reference angle; and
controlling a display device to move the virtual object in a depth direction on the line in the first direction and display the virtual object, wherein
a distance between an intersection where the first direction and the second direction intersect and the virtual object is maintained based on a determination result of the determination.

11. A non-transitory computer-readable medium having stored thereon, computer-executable instructions that when executed by a computer, causes the computer to execute operations, the operations comprising:
- acquiring an operation angle that is an angle between a first direction in a specific space pointed by a user and a second direction in the specific space pointed by the user;
- setting, as a reference angle, the operation angle acquired at a time point when an instruction to start moving a virtual object on a line extending in the first direction is detected;
- determining whether the operation angle acquired in response to a change in the second direction is equal to or more than the reference angle; and
- controlling a display device to move the virtual object in a depth direction on the line in the first direction and display the virtual object, wherein
  - a distance between an intersection where the first direction and the second direction intersect and the virtual object is maintained based on a determination result of the determination.

\* \* \* \* \*